US008848658B2

(12) United States Patent
Gorokhov et al.

(10) Patent No.: US 8,848,658 B2
(45) Date of Patent: Sep. 30, 2014

(54) INTER-FREQUENCY INDICATION OF ASSOCIATION DATA FOR MULTI-CARRIER WIRELESS DEPLOYMENTS

(75) Inventors: Alexei Y. Gorokhov, San Diego, CA (US); Aamod Dinkar Khandekar, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 858 days.

(21) Appl. No.: 12/761,170

(22) Filed: Apr. 15, 2010

(65) Prior Publication Data

US 2010/0265913 A1   Oct. 21, 2010

Related U.S. Application Data

(60) Provisional application No. 61/170,403, filed on Apr. 17, 2009.

(51) Int. Cl.
*H04W 4/00* (2009.01)
*H04W 36/00* (2009.01)

(52) U.S. Cl.
CPC ...... *H04W 36/0055* (2013.01); *H04W 36/0072* (2013.01); *H04W 36/0066* (2013.01)
USPC .......................................... 370/331; 455/437

(58) Field of Classification Search
USPC ................ 370/329–334; 455/422.1, 436–444
See application file for complete search history.

(56) References Cited

U.S. PATENT DOCUMENTS

| 6,449,486 | B1 * | 9/2002 | Rao ............................... 455/440 |
| 6,611,506 | B1 * | 8/2003 | Huang et al. .................. 370/329 |
| 7,164,916 | B1 * | 1/2007 | Ahnlund et al. .............. 455/437 |
| 7,363,039 | B2 * | 4/2008 | Laroia et al. .................. 455/436 |
| 2003/0119550 | A1 * | 6/2003 | Rinne et al. .................. 455/553 |
| 2005/0096051 | A1 * | 5/2005 | Lee et al. ...................... 455/438 |
| 2005/0124344 | A1 * | 6/2005 | Laroia et al. .................. 455/436 |

(Continued)

FOREIGN PATENT DOCUMENTS

| CN | 101248686 A | 8/2008 |
| EP | 1909523 A1 | 4/2008 |

(Continued)

OTHER PUBLICATIONS

International Search Report and Written Opinion—PCT/US2010/031484, International Search Authority—European Patent Office—Jul. 23, 2010.

*Primary Examiner* — Jeffrey M Rutkowski
(74) *Attorney, Agent, or Firm* — Anthony R. Morris

(57) ABSTRACT

Providing for user equipment mobility in a multi-carrier wireless network deployment is described herein. By way of example, data pertinent to mobile cell selection can be shared among base stations operating on different carrier frequencies either over-the-air or via a wired backhaul, and distributed by a base station to mobile terminals served by the base station. In one aspect, the data can be distributed over a wireless channel reserved for inter-carrier association data, whereas in other aspects, the data can be unicast to particular mobile terminals served by the base station. This can reduce or avoid a need for individual mobile terminals to tune away to a non-serving carrier for inter-carrier association or handover determinations. Accordingly, gaps in signal analysis on a serving carrier can be reduced or avoided, improving overall quality of wireless communication in a multi-carrier environment.

54 Claims, 14 Drawing Sheets

(56) References Cited

U.S. PATENT DOCUMENTS

| | | |
|---|---|---|
| 2009/0003279 A1* | 1/2009 | Abusch-Magder et al. .. 370/331 |
| 2009/0059846 A1* | 3/2009 | Burgess et al. ............... 455/436 |
| 2009/0239537 A1* | 9/2009 | Iwamura et al. ............. 455/436 |
| 2009/0310563 A1* | 12/2009 | Chou et al. ................... 370/331 |
| 2010/0075694 A1* | 3/2010 | Damnjanovic et al. .... 455/452.2 |
| 2010/0093358 A1* | 4/2010 | Cheong et al. ................ 455/444 |
| 2010/0144297 A1 | 6/2010 | Suzuki et al. |
| 2010/0157885 A1 | 6/2010 | Koyanagi et al. |

FOREIGN PATENT DOCUMENTS

| | | |
|---|---|---|
| JP | 2008270905 A | 11/2008 |
| WO | 2007023786 A1 | 3/2007 |
| WO | WO 2008097149 | 8/2008 |

* cited by examiner

INTER-FREQUENCY INDICATION OF ASSOCIATION DATA FOR MULTI-CARRIER WIRELESS DEPLOYMENTS

CLAIM OF PRIORITY UNDER 35 U.S.C §119

The present Application for Patent claims priority to Provisional Patent Application Ser. No. 61/170,403 entitled "METHOD AND APPARATUS TO ENABLE INTER-FREQUENCY INDICATION OF ASSOCIATION DATA FOR HETEROGENEOUS DEPLOYMENTS" and filed Apr. 17, 2009, assigned to the assignee hereof and hereby expressly incorporated by reference herein.

BACKGROUND

I. Field

The following description relates generally to wireless communications, and more particularly to facilitating packet data network connectivity for local Internet Protocol access traffic for wireless communication, in a network deployment.

II. Background

Wireless communication systems are widely deployed to provide various types of communication content, such as voice content, data content, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

Recent advances in mobile communication involve integration of mobile networks (e.g., comprising a voice network) and Internet Protocol (IP) based networks. This integration enables a vast amount of multimedia resources available over IP-type networks to be accessible on mobile phones, laptop computers, and so forth. In addition, this integration has enabled high quality voice communication, including circuit-switched and packet-switched communication, to be available over various types of network interface mechanisms (e.g., wireless local area network, Broadband IP, dial-up, cellular radio network, and so on). As core network infrastructure advances over time, additional mechanisms for achieving integrated voice and IP communication are realized. Further, advancements in radio network infrastructure enable a wider range of subscribers to access integrated voice and IP services, even in remote geographic areas or areas traditionally having poor signal geometry.

Like core network infrastructure, radio network infrastructure has received significant attention from service providers for meeting needs of subscribes and leveraging capabilities of mobile user equipment. For instance, recent advancements have seen various types of base stations deployed within a common area, resulting in a heterogeneous access point network. Thus, in addition to a conventional deployment of macro base stations, lower power base stations such as micro and pico base stations, base station relays and repeaters, smart repeaters, and the like, have been included within planned macro deployments, to improve wireless service in targeted geographic regions. In other circumstances, low power base stations can be deployed indoors in shopping malls, large buildings, and so on, to provide similar coverage for an indoor building or complex.

In addition to operator deployed base stations, a new type of base station deployed by subscribers or wireless service users are emerging. In contrast to operator deployed base stations, these subscriber-deployed base stations can be established in various locations by individual subscribers independent of operator deployments. Subscriber-deployed base stations can provide significant access benefits for wireless service users in a limited area, such as a person's home, office, apartment building, and so on. However, various challenges result as well, including mitigating interference from dense deployments of subscriber-deployed base stations, allocating wireless resources to these base stations, providing mobility for user terminals, establishing billing and charging functions delivered over these base stations, and the like. Accordingly, significant ongoing development in wireless networking involves identifying solutions for technical inconsistencies in heterogeneous deployments, as well as tweaking operation of these types of deployments to optimize wireless operation.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the subject disclosure in a simplified form as a prelude to the more detailed description that is presented later.

Aspects of the subject disclosure provide for user equipment mobility in a multi-carrier wireless network deployment. In some aspects, described is cross carrier indication of data pertinent to mobile cell selection to facilitate inter-carrier mobility. This can be utilized for instance, in a heterogeneous access point environment, where macro base stations operate on a first carrier frequency and a second set of base stations, such as micro, pico or Femto base stations, or relay or repeater base stations, operate on one or more additional carrier frequencies. The data can be shared among base stations either over-the-air or via a wired backhaul, and distributed on a serving carrier to mobile terminals served by respective base stations. This can reduce or avoid a need of individual mobile terminals having to tune away to a non-serving carrier for association or handover determinations pertaining to the non-serving carrier. Accordingly, gaps in signal analysis on the serving carrier can be reduced or avoided, improving overall quality of wireless communication in a multi-carrier environment.

In particular aspects of the subject disclosure, provided is a method of wireless communication. The method can comprise obtaining cell selection data pertaining to a first carrier frequency employed by a base station to serve mobile terminals operating on the first carrier frequency. Further, the method can comprise transmitting the cell selection data for mobile terminals operating on a second carrier frequency employed by a second base station, to facilitate inter-carrier handover determinations pertaining to the first carrier frequency.

In another aspect, disclosed is an apparatus configured for wireless communication. The apparatus can comprise a communication interface for wired electronic communication and for wireless electronic communication on at least a serving carrier. Moreover, the apparatus can comprise memory for storing instructions configured for facilitating inter-carrier mobility within a wireless network and a data processor for executing modules to implement the instructions. Particularly, these modules can include an acquisition module that obtains a set of mobility information relevant to mobile handover decisions involving a non-serving carrier, wherein the non-serving carrier and the serving carrier are distinct frequencies within the wireless network. In at least one aspect, the modules can also include a broadcast module that transmits at least a subset of the set of mobility information for facilitating cell selection for a user equipment (a UE) operating on the serving carrier.

According to other aspects, disclosed is an apparatus configured for wireless communication. The apparatus can comprise means for obtaining a set of cell selection data from a first base station operating on a first carrier frequency. Moreover, the apparatus can comprise means for transmitting at least a subset of the set of cell selection data to mobile terminals operating on a second carrier frequency employed by a second base station, to facilitate inter-carrier handover determinations pertaining to the first carrier frequency.

In an additional aspect, provided is at least one processor configured for wireless communication. The processor(s) can comprise a module for obtaining a set of cell selection data from a first base station operating on a first carrier frequency. In addition, the processor(s) can comprise a module for transmitting at least a subset of the set of cell selection data to mobile terminals operating on a second carrier frequency employed by a second base station, to facilitate inter-carrier handover determinations pertaining to the first carrier frequency.

In still other aspects, the subject disclosure provides a computer program product comprising a computer-readable medium. The computer-readable medium can comprise code for causing a computer to obtain a set of cell selection data from a first base station operating on a first carrier frequency. In addition, the computer-readable medium can comprise code for causing the computer to transmit at least a subset of the set of cell selection data to mobile terminals operating on a second carrier frequency employed by a second base station, to facilitate inter-carrier handover determinations pertaining to the first carrier frequency.

Further to the above, disclosed is a method of wireless communication. The method can comprise obtaining a set of data related to a neighboring wireless carrier. Additionally, the method can comprise obtaining, or employing a data processor to calculate, quality or performance information pertaining to a serving wireless carrier utilized by a mobile device in conjunction with determining whether to handover from the serving wireless carrier to the neighboring wireless carrier.

In another aspect, provided is an apparatus configured for wireless communication. The apparatus can comprise a wireless communication interface for receiving wireless signals on multiple wireless carriers. Further, the apparatus can comprise memory for storing instructions configured for facilitating inter-carrier mobility within a wireless network and a data processor for executing modules to implement the instructions. Specifically, the modules can comprise an acquisition module that tunes the wireless communication interface to an acquisition channel to obtain a set of cell selection data relevant to mobile handover decisions involving a non-serving carrier. In another aspect, the modules can comprise a decision module that employs the set of cell selection data at least in part for determining whether to perform a handover from a serving carrier to the non-serving carrier.

According to one or more further aspects of the subject disclosure, provided is an apparatus for wireless communication. The apparatus can comprise means for obtaining a set of data related to a neighboring wireless carrier. Further, the apparatus can comprise means for obtaining quality or performance information pertaining to a serving wireless carrier. In addition to the foregoing, the apparatus can also comprise means for conducting a handover from the serving wireless carrier to the neighboring wireless carrier based on analysis of the neighboring wireless carrier and the serving wireless carrier.

Further to the above, disclosed is at least one processor configured for wireless communication. The processor(s) can comprise a module that obtains a set of data related to a neighboring wireless carrier. Further, the processor(s) can comprise a module that generates quality or performance information pertaining to a serving wireless carrier utilized by a mobile device. Moreover, the processor(s) can comprise a module that determines whether to handover from the serving wireless carrier to the neighboring wireless carrier.

In another disclosed aspect, the subject disclosure provides a computer program product comprising a computer-readable medium. The computer-readable medium can comprise code for causing a computer to obtain a set of data related to a neighboring wireless carrier. The computer-readable medium can also comprise code for causing the computer to generate quality or performance information pertaining to a serving wireless carrier utilized by a mobile device. Furthermore, the computer-readable medium can comprise code for causing the computer to determine whether to handover from the serving wireless carrier to the neighboring wireless carrier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
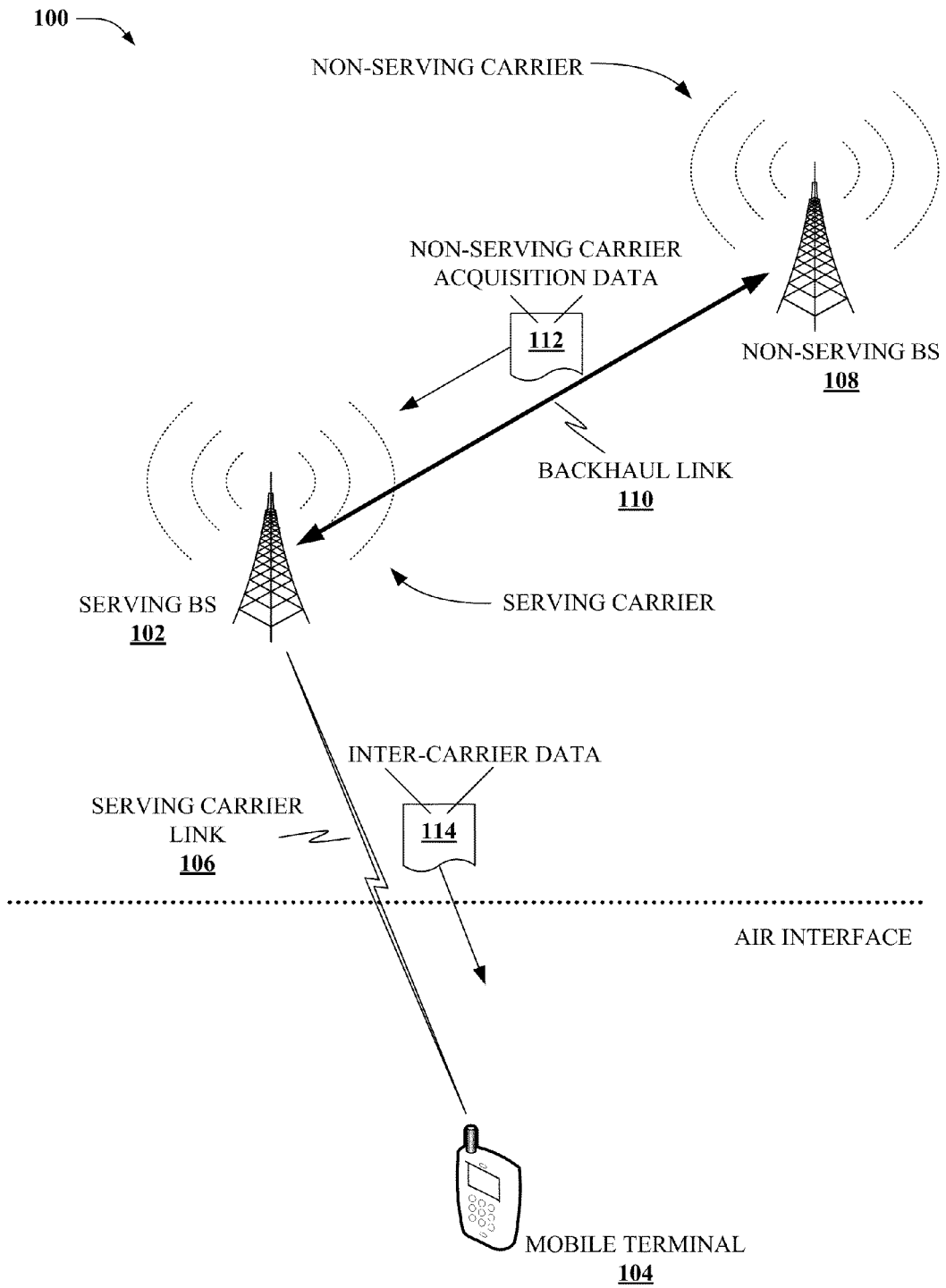
FIG. 1 illustrates a block diagram of an example wireless environment for inter-carrier association according to aspects of the subject disclosure.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing mobility and association in a multi-carrier network deployment, among other things. One skilled in the art should appreciate that similar techniques could apply to other communication environments.

Introduction of subscriber-deployed base station into wireless access networks enables significant flexibility and consumer control over personal access to such networks. These subscriber-deployed base stations are also referred to as home base stations, and can include home Node B (HNB) base stations, enhanced HNB, or home eNode B (HeNB) (where the term H(e)NB refers to an entity that could be either an HNB or an HeNB), Femto cells, Femto base stations, or the like. Although these are distinct examples of subscriber-deployed base stations, these terms are used interchangeably herein to refer to subscriber-deployed base stations in general, except where otherwise noted (e.g., in conjunction with a particular cellular system that employs only one or another such base station).

Several challenges arise upon introduction of low power or subscriber-deployed base stations within a macro base station deployment. For instance, in the latter case, subscriber-deployed cells can operate under a restricted association or a closed subscriber group (CSG), which limits network access at a particular base station to those mobile terminals included in the CSG. In a traditional homogeneous deployment, a mobile terminal typically requests access to a cell having highest signal geometry (e.g., best signal to noise ratio). However, in a heterogeneous deployment, the mobile terminal may not be permitted to access a cell having highest signal geometry, or it may be beneficial to connect instead to a cell having lowest path loss to reduce interference.

In addition to the foregoing, different base station classes (e.g., macro, micro, pico, Femto) can be configured to operate on different carrier frequencies in overlapping or nearby geographic regions. To access signal information for multiple such base stations, a mobile terminal operating on a carrier employed by a base station serving the mobile terminal (a serving carrier, and a serving base station, respectively) or a base station the mobile terminal is camped on, would tune away to a non-serving carrier to detect a cell on the non-serving carrier. This can cause the mobile terminal to lose signal measurements on the serving carrier for a period of time required to tune away to the non-serving carrier and tune back to the serving carrier. Tuning away to multiple carriers can be expensive in terms of battery life, and could impede connected mode performance due to measurement gaps on the serving carrier.

The problem of cross carrier tuning can be particularly acute in heterogeneous networks because, unlike in homogeneous planned networks, a given serving base station may not have relevant cell selection or association information about neighboring base stations and carriers employed by those base stations. Even if cross-carrier information is available, it may not be beneficial for the mobile terminal to tune away as it may not identify any preferable or accessible cells on another carrier, while still incurring measurement gaps on the serving carrier. For instance, non-serving carrier cells might have poorer path loss, or may deny access to the mobile terminal. Additionally, cell detection times in heterogeneous deployments can be quite large, particularly if a network relies on a low duty cycle preamble or low duty cycle control channel transmission for acquisition pilots. One specific example includes a low reuse preamble that occurs infrequently and can suffer from high interference in some instances. Further, lack of network synchronization can extend tune away time in a multi-carrier environment. Aspects of the subject disclosure are intended to address these and other problems with multi-carrier network deployments, by providing inter-carrier cell detection to improve wireless network efficiency and wireless infrastructure penetration in valuable markets.

FIG. 1 illustrates a block diagram of an example wireless communication environment 100 according to aspects of the subject disclosure. Wireless communication environment 100 comprises a serving base station 102 wireless coupled with a mobile terminal 104 over an air interface. Particularly, the air interface includes a wireless communication link with serving base station 102 on a carrier frequency employed by serving base station 102 (also referred to herein as a serving carrier, serving carrier frequency, serving frequency, or the like). The wireless communication link over the serving carrier is also referred to as a serving carrier link 106.

It should be appreciated that serving base station 102, mobile terminal 104 and serving carrier link 106 can comprise one of various wireless communication systems. In one instance, wireless communication environment 100 can be a subset of a radio access interface of a cellular communication system (e.g., a universal mobile telecommunications system [UMTS] terrestrial radio access network [UTRAN], an evolved UTRAN [e-UTRAN], a GSM [global system for mobile communication]/EDGE [enhanced data rate for GSM evolution] radio access network [GERAN], or other suitable air interface comprising base stations, components that govern networking of base stations, and interfaces between the base stations, components and a cellular core network]). Although not depicted, wireless communication environment 100 can also comprise a communication link or interface to a cellular core network, in this case. In other instances, wireless communication environment 100 can comprise a wireless communication network employing a non-licensed radio frequency with an Internet Protocol communication standard, such as a WiFi network, a worldwide interoperability for microwave access (WiMAX) network, or the like. In these latter instances, wireless communication environment 100 can be linked with a broader communication or data network through an Internet Service Provider (ISP) for instance, or can be coupled with a local are network, a wide area network such as an intranet, or the like, or a suitable combination thereof In addition to the foregoing, serving base station 102 is communicatively coupled with at least one addition non-serving base station 108. In addition, non-serving base station 108 employs a different carrier frequency than serving base station 102, which will be referred to as a non-serving carrier (but can also be referred to as a second carrier, a neighboring carrier, a cross-carrier, or the like, where different carrier names refer to different or distinct carrier frequencies that can be utilized for wireless communication). Non-serving base station 108 and serving base station 102 can be within a common base station subsystem, in one example (e.g., managed by a common radio network controller—not depicted), although the subject disclosure is not so limited. In other examples, serving base station 102 and non-serving base station 108 can be base stations in different radio access networks (e.g., a UTRAN and a GERAN network), can be different size base stations or have different transmit power (e.g., macro versus micro, 50 watt versus 15 watt, etc.), have different access rules (e.g., general access, restricted access), or the like, or a suitable combination thereof As a particular illustrative example, serving base station 102 can be a macro base station of a third generation partnership project (3GPP) long term evolution (LTE) network that employs a first carrier frequency (the serving carrier), whereas non-serving base station 108 can be a macro base station of a 3GPP LTE advanced (or LTE-A) network that employs a second carrier frequency. In another example, serving base station 102 can be a macro base station operating on the serving carrier, whereas non-serving base station 108 can be a subscriber-deployed base station (e.g., a home Node B [HNB], a home eNode B [HeNB], a home base station, a Femto access point, a Femto base station, and so on) operating on the non-serving carrier. Other suitable examples will be recognized by one of skill in a technical art(s) relevant to the subject disclosure, whether through technical experience or the context provided herein, and those examples are considered within the scope of the subject disclosure.

In operation, serving base station 102 obtains a message(s) 112 from non-serving base station 108 over a backhaul link 110 that communicatively couples serving base station 102 and non-serving base station 108. Backhaul link 110 can comprise a wired communication link (e.g., an Ethernet link, twisted pair [e.g., twisted copper pair], digital subscriber line, a coaxial cable link, a fiber optic communication link, and so on) or a wireless communication link (e.g., a reserved set of resources on the serving carrier, the non-serving carrier, or a third carrier frequency, a WiFi link, an over-the-air [OTA] link comprising mobile terminal 104 [or one or more other mobile terminals] acting as an intermediary between non-serving base station 108 and serving base station 102, or the like), or a suitable combination thereof In addition, message(s) 112 can comprise non-serving carrier acquisition data pertinent to non-serving base station 108, or the non-serving carrier employed by non-serving base station 108. This non-serving carrier acquisition data can comprise various types of data that can be utilized for inter-carrier mobility functions involving mobile terminal 104 (whether mobile initiated, network initiated or a combination thereof), such as cell selection, cell acquisition, maintaining an active set of base stations, conducting a soft handoff or a hard handover, camping on a carrier, and so forth. The various types of data included in message(s) 112 can include at least one of the following: cell or non-serving carrier loading information, power class information, closed subscriber group (CSG) information, anchor carrier information, a full or a partial cell identity (for cells operating on the non-serving carrier), number of—or identifier for—the non-serving carrier or a subband, a channel or a hybrid automatic repeat request interlace (a HARQ interlace) thereof on an uplink (an UL) or a downlink (a DL), a fraction of resources allocated to a typical mobile terminal on the non-serving carrier, interference level for the non-serving carrier or the subband, the channel or the HARQ interlace thereof, a data rate on the DL or the UL of a cell operating on the non-serving carrier, a quality of service guarantee (a QoS guarantee), a backhaul bandwidth, an effective isotropic radiated power, a maximum power amplifier output power, a receiver noise figure, or a base station battery power level, or a like set of data involved in mobile terminal mobility functions relevant to the non-serving carrier, or a suitable combination of any of the foregoing. Particular subsets of the foregoing non-serving carrier acquisition data provided within message(s) 112 can be requested by serving base station 102, specified by a radio network controller governing one or more of serving base station 102 or non-serving base station 108, specified and stored in memory as a default for inter-carrier cell acquisition, etc.

Inter-carrier acquisition data received in message(s) 112 can be conveyed to mobile terminal 104 over serving carrier link 106 in a wireless message(s) 114. The inter-carrier acquisition data can be all or a suitable subset of all non-serving carrier acquisition data provided by non-serving base station 108. In one instance, serving base station 102 can filter a subset of the non-serving carrier acquisition data that is pertinent to mobility functions of mobile terminal 104, and include this subset as the inter-carrier acquisition data in wireless message(s) 114. In a particular aspect, serving base station 102 can analyze the non-serving carrier acquisition data in conjunction with non-serving carrier measurements performed at mobile terminal 104 (and forwarded to serving base station 102 over serving carrier link 106), to provide terminal-specific information for handover determinations of mobile terminal 104, or alternatively can employ the non-serving carrier acquisition data and non-serving carrier measurements to make a handover determination for mobile terminal 104. In at least one instance, inter-carrier data included in wireless message(s) 114 can include a command to handover to non-serving base station 108, or a command to include non-serving base station 108 in an active set of base stations, or the like.

By receiving non-serving carrier acquisition data from non-serving base station 108, serving base station 102 can broadcast this information on a serving channel, avoiding or reducing frequency of a need for mobile terminal 104 to tune away to the non-serving carrier to conduct inter-carrier mobility determinations. Where tuning away to the non-carrier frequency is necessary, this tuning away can be directed by serving base station 102, to mitigate degradation of serving carrier measurements at mobile terminal 104 during a tune away period. This can substantially improve overall reliability of wireless communications in a multi-carrier environment such as wireless communication environment 100.

Figure 2:
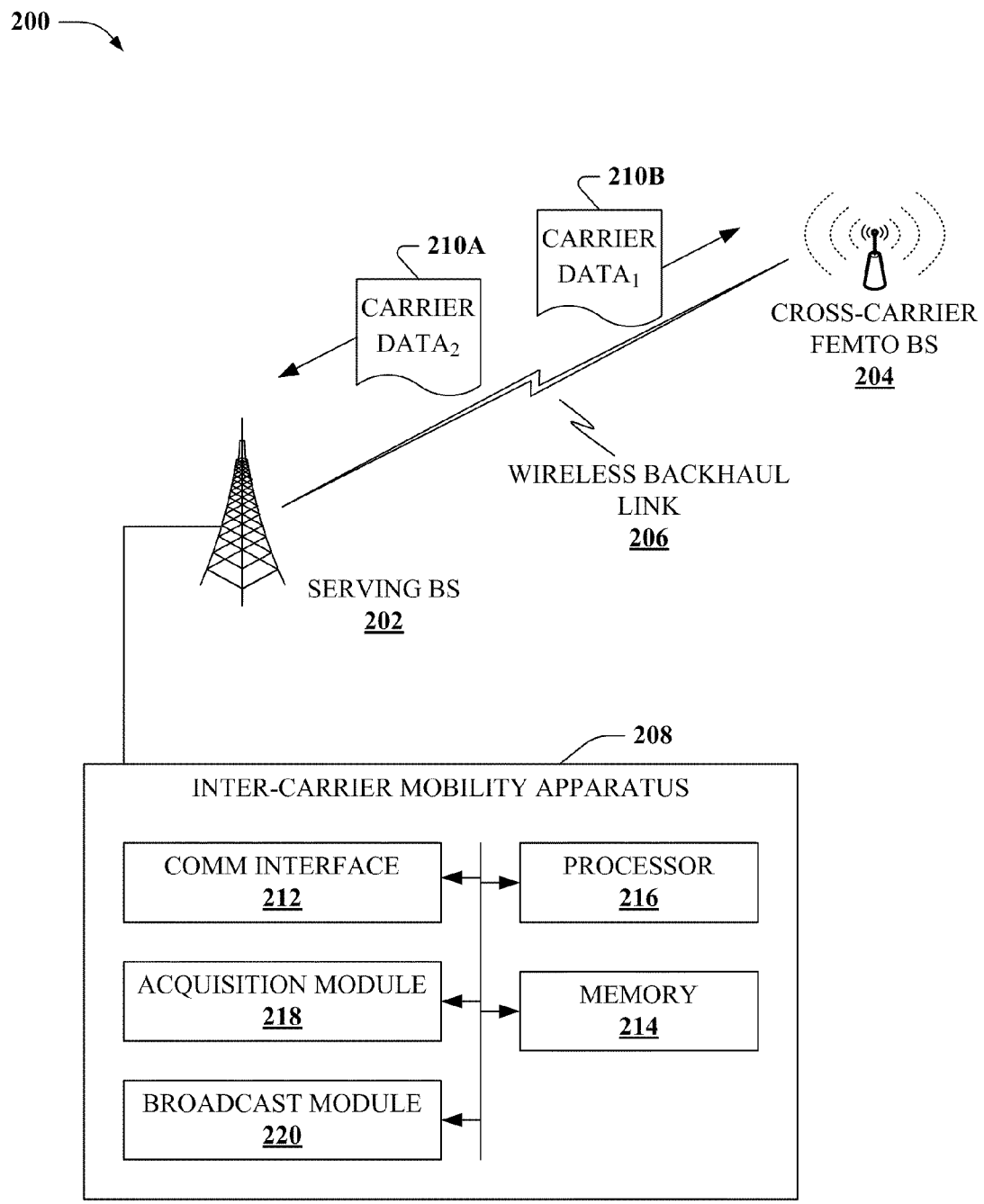
FIG. 2 depicts a block diagram of a sample wireless deployment that supports cross-carrier mobility according to particular aspects.

FIG. 2 illustrates a block diagram of an example wireless communication system 200 according to aspects of the subject disclosure. Wireless communication system 200 can comprise a serving base station 202 communicatively coupled with a cross-carrier Femto base station 204 (a Femto BS 204) that employs a different carrier frequency than serving base station 202 for mobile terminal access communication. Additionally, serving base station 202 and Femto BS 204 are coupled via a wireless backhaul link 206, over which the respective base stations can exchange carrier acquisition data respective carrier frequencies employed by the respective base stations. Particularly, serving base station 202 can send carrier data$_1$ 210B to Femto BS 204 comprising cell selection or acquisition data pertaining to a first carrier frequency employed by serving base stations 202, whereas Femto BS 204 can send carrier data$_2$ 210A comprising cell selection or acquisition data pertaining to a second carrier frequency employed by Femto BS 204.

Serving base station 202 can comprise, or be communicatively coupled with, an inter-carrier mobility apparatus 208 that provides inter-carrier mobility service for mobile terminals camping on or actively connected to serving base station 202. Inter-carrier mobility apparatus 208 can comprise a communication interface 212 for wired electronic communication (e.g., with serving base station 202, or with a second base station over a wireless backhaul link—not depicted) and for wireless electronic communication on at least a serving carrier (e.g., with the mobile terminals camping on or actively connected to serving base station 202). In some aspects of the subject disclosure, communication interface 212 comprises an electronic interface to a wired backhaul link coupling a base station operating on a serving carrier (serving base station 102 of FIG. 1, supra) with a second base station operating on a non-serving carrier (non-serving base station 108, supra). In at least one alternative or additional aspect, communication interface 212 can operate on a carrier or wireless technology utilized by wireless backhaul link 206, to send and receive data with Femto BS 204 either directly or via electronic communication hardware of serving base station 202 (e.g., a transmit-receive chain of serving base station 202—not depicted—but see FIG. 12, infra).

Further to the above, inter-carrier mobility apparatus 208 can comprise memory 214 for storing instructions configured for facilitating inter-carrier mobility within a wireless network and a data processor 216 for executing modules to implement the instructions. Particularly, the modules can comprise an acquisition module 218 that obtains a set of mobility information (e.g., from a non-serving base station—such as Femto BS 204—over wireless backhaul link 206) relevant to mobile handover decisions involving a non-serving carrier employed by Femto BS 204, wherein the non-serving carrier and a serving carrier employed by serving base station 202 are distinct frequencies within the wireless network. In at least one aspect of the subject disclosure, the set of mobility information can comprise a suitable subset of the non-serving carrier acquisition data (in this case pertaining to Femto BS 204) discussed above at FIG. 1, supra. In addition, the modules that facilitate inter-carrier mobility instructions can include a broadcast module 220 that transmits at least a subset of the set of mobility information for facilitating cell selection for a user equipment (a UE—also referred to interchangeably herein as a mobile terminal, mobile device, user terminal, and so on) operating on the serving carrier. This enables the UE to obtain the subset of the set of mobility information on the serving carrier, without tuning to the non-serving carrier. This can reduce or avoid a need to tune away to the non-serving carrier to perform mobility decisions involving the non-serving carrier.

It should be appreciated that the subset of the set of mobility information can be generated based on what non-serving carriers are observed at one or more UEs coupled with serving base station 202, or particular wireless conditions observed by one or more of the UEs. Alternatively, or in addition, the subset of the set of mobility information can be a default subset established for a serving carrier employed by serving base station 202, or can comprise one or more mobility commands based on signal analysis performed by inter-carrier mobility apparatus 208 (e.g., see FIG. 3, infra). In one instance, the subset of the set of mobility information includes data pertaining to a non-serving carrier that is employed by a UE to compute a metric of a non-serving wireless channel, the metric being utilized by the UE in a mobility decision pertaining to the non-serving carrier.

In at least one aspect of the subject disclosure, wireless communication system 200 can comprise one or more additional non-serving base stations (instead of or in addition to Femto BS 204) communicatively coupled with serving base station 202. In some cases, communication interface 212 is configured for wireless communication at least on one or more non-serving carriers, and acquisition module 218 obtains mobility information from an uplink transmission on one or more such non-serving carriers (e.g., OTA from a UE, relay, repeater, etc., served by or associated with a non-serving base station). Alternatively, or in addition, acquisition module 218 can be configured as a module that obtains mobility information from a non-serving base station on a wireless backhaul link that employs a non-serving carrier, or a wireless backhaul link over a wired connection between serving base station 202 and a non-serving base station. Accordingly, acquisition module 218 can be configured to receive mobility information over various interfaces that can comprise communication interface 212.

According to another alternative aspect, carrier data$_2$ 210A can be transmitted by Femto BS 204 periodically, as directed by a network, or based on periodic requests from inter-carrier mobility apparatus 208. This enables changes in wireless conditions on a non-serving carrier employed by Femto BS 204 to be represented in subsequent iterations of carrier data$_2$ 210. In some cases, the periodic requests or transmissions can occur at a rate specific to the non-serving carrier, or specific to the serving carrier, at a random or pseudo-random time (determined at serving base station 202 or Femto BS 204), or some other rate. Based on these transmissions, acquisition module 218 therefore periodically obtains mobility information pertaining to the non-serving carrier(s), optionally filters a subset(s) of the mobility data that is pertinent to one or more UEs served by serving base station 202, and provides the mobility data or filtered subset(s) to broadcast module 220, which thus periodically transmits the mobility information or subset(s) pertaining to the non-serving carrier(s) at a rate specified to such carrier(s).

Figure 3:
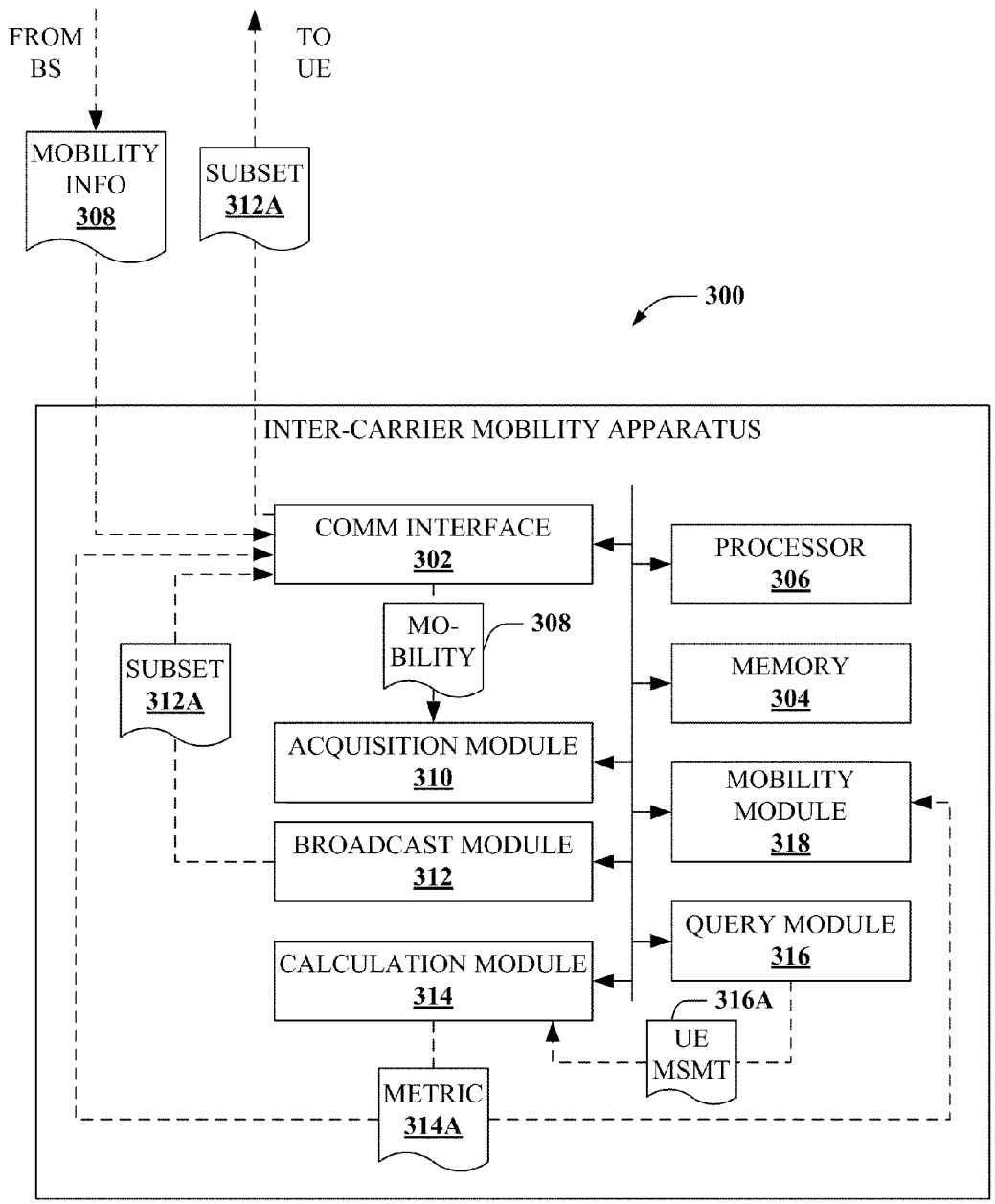
FIG. 3 illustrates a block diagram of an example apparatus that provides inter-carrier mobility according to further aspects.

FIG. 3 illustrates a block diagram of an example inter-carrier mobility apparatus 300 according to further aspects of the subject disclosure. Inter-carrier mobility apparatus 300 can be coupled to or included within a base station (e.g., a serving base station - not depicted, but see FIG. 2, supra) of a wireless network to facilitate inter-carrier mobility for UEs (not depicted, but see FIG. 1, supra) served by the base station. Inter-carrier mobility apparatus 300 can comprise a communication interface 302 that is communicatively coupled with, or includes, a transmit-receive chain of the base station, and can also be coupled with or include a wired communication interface of the base station. Communication interface 302 receives a set of mobility information 308 pertaining to a second base station that employs a different carrier (a non-serving carrier) than a carrier employed the base station (a serving carrier). Further, inter-carrier mobility apparatus 300 can comprise memory 304 for storing instructions to facilitate the inter-carrier mobility, and a data processor 306 that executes one or more modules to implement the instructions.

In addition to the foregoing, inter-carrier mobility apparatus 300 can comprise an acquisition module 310 that receives the set of mobility information 308 from communication interface 302, and provides the set of mobility information 308 to a broadcast module 312. Broadcast module 312 then transmits at least a subset of the set of mobility information 312A for facilitating cell selection for a UE operating on the serving carrier. Particularly, broadcast module 312 can employ communication interface 302 (and a transmit-receive chain of the base station) to transmit the subset of the set of mobility information 312A on the serving carrier to the UE. In at least one aspect, the subset of the set of mobility information 312A includes data pertaining to the non-serving carrier that is employed by the UE to compute a metric of a non-serving wireless channel, wherein the metric is utilized by the UE in a mobility decision pertaining to the non-serving carrier. In this manner, the UE does not need to tune to the non-serving carrier at least to obtain the subset of the set of mobility information 312A, mitigating interruption of signal measurements on the serving carrier.

According to other aspects, inter-carrier mobility apparatus 300 can perform signal analysis on the set of mobility information or on downlink signal measurements provided by the UE to perform or to facilitate mobility determinations pertaining to the non-serving carrier for the UE. To this end, inter-carrier mobility apparatus 300 can further comprise a calculation module 314 that employs at least a second subset of the set of mobility information to compute a metric 314A for a downlink signal on the non-serving carrier. The metric 314A can be one or more suitable measures of signal quality, signal strength, access capability (e.g., a closed subscriber group [CSG] of the second base station), or other suitable metric related to cell selection or acquisition. In at least one aspect, the metric 314A of the downlink signal comprises at least one of a transmit energy metric indicative of transmit energy of the downlink signal, a pathloss indicative of channel gain between the UE and an entity that transmits the downlink signal (e.g., the second base station), an effective geometry metric indicative of received quality of the downlink signal at the UE, a projected data rate indicative of an achievable or supported data rate for the UE, or a control channel reliability metric indicative of reliability of control channels on the non-serving carrier, or the like, or a suitable combination thereof.

Additionally, inter-carrier mobility apparatus 300 can comprise a query module 316. Query module 316 can be configured to obtain UE-specific signal measurements pertaining to the non-serving carrier in conjunction with mobility determinations performed by calculation module 314. Thus, in one example, query module 316 instructs the UE to submit a UE measurement 316A of the downlink signal on the non-serving carrier to facilitate computation of metric 314A. In this case, the UE measurement 316A is obtained from communication interface 302 and provided to calculation module 314 for determining the metric 314A.

In a further aspect, the metric 314A can be stored in memory 318 for utilization by other modules of inter-carrier mobility apparatus 300, to perform a handover decision (pertaining to the non-serving carrier) for the UE. For instance, inter-carrier mobility apparatus 300 can comprise a mobility module 318 that employs the metric 314A pertaining to the non-serving carrier to determine whether the UE should conduct a handover to the non-serving carrier. In this aspect, the subset of the set of mobility information transmitted by broadcast module 312 at least in part comprises an order to conduct the handover to the non-serving carrier. In another aspect, the subset of the set of mobility information transmitted to the UE via communication interface 302 at least in part comprises metric 314A to facilitate performing the handover decision at the UE. Thus, inter-carrier mobility apparatus 300 can assist in mobility determinations by forwarding information pertinent to the non-serving carrier over the serving carrier, or can perform those decisions and instruct the UE to conduct the handover to the non-serving carrier. Additionally, forwarding information or instructing the UE can be performed periodically, based on periodic receipt of the set of mobility information 308 from the second base station.

Figure 4:
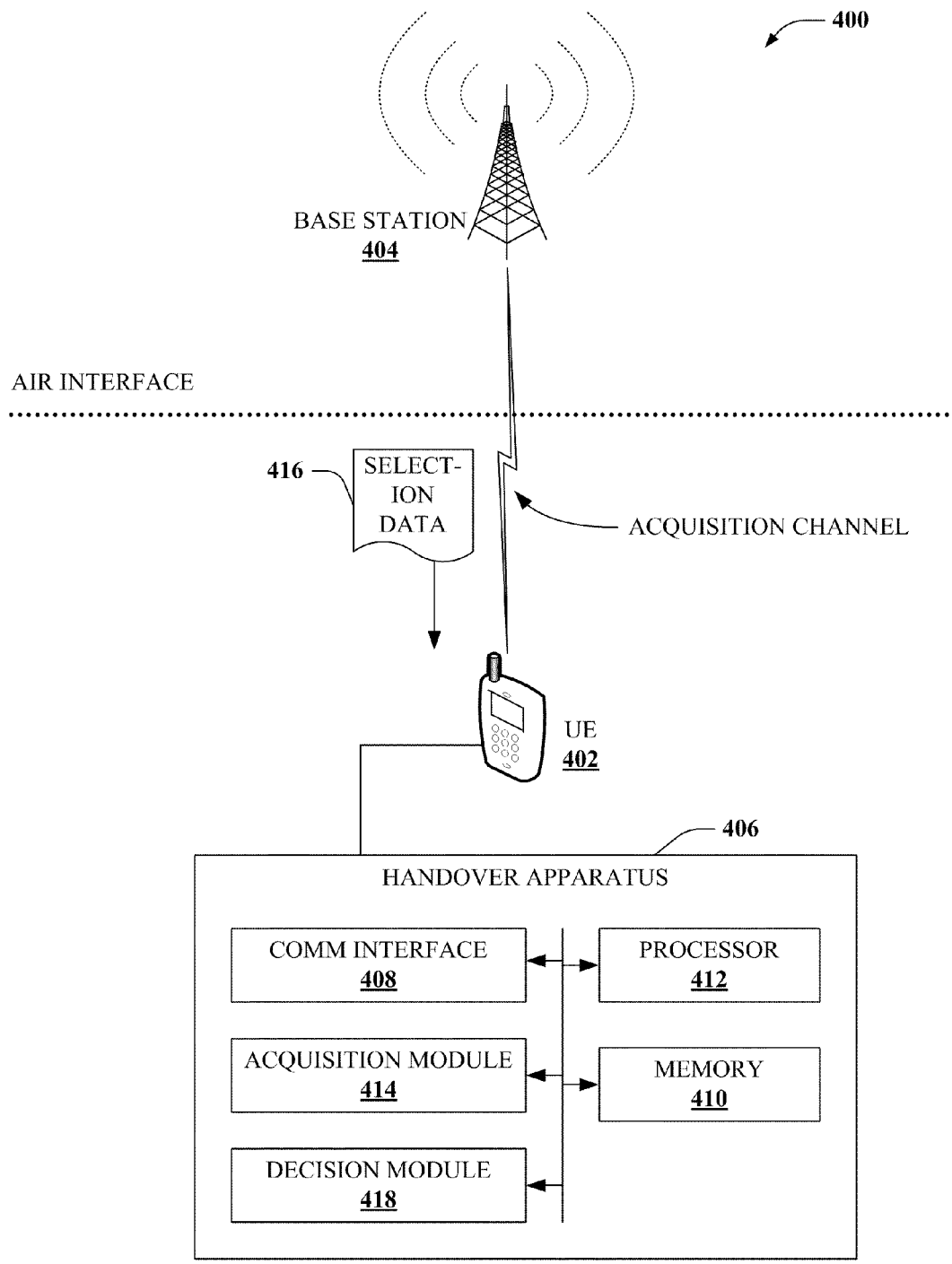
FIG. 4 depicts a block diagram of a sample wireless communication to facilitate inter-carrier association.

FIG. 4 illustrates a block diagram of an example wireless communication system 400 according to one or more additional aspects disclosed herein. Wireless communication system 400 comprises a UE 402 communicatively coupled with a base station 404. In addition, UE 402 comprises a handover apparatus 406 for facilitating inter-carrier mobility determinations for UE 402.

In operation, UE 402 can communicate wirelessly with base station 404 over an air interface and a wireless link. Particularly, the wireless can comprise at least one acquisition channel, which is composed of a subset of wireless resources (e.g., time-frequency resources, a frequency subband(s), one or more time subslots or interlaces, a reserved code, or the like) associated with the wireless link. The acquisition channel can be a channel provided by a base station serving UE 402, for instance, or a base station on which UE 402 is camped on, which can include base station 404.

Handover apparatus 406 can comprise a wireless communication interface 408 for receiving wireless signals on multiple wireless carriers. Particularly, wireless communication interface 408 can communicate on a serving carrier employed by base station 404, and at least one non-serving carrier. Wireless communication can be implemented by employing a transmit-receive chain of UE 402 (e.g., see FIG. 5, infra), that is also configured for sending and receiving wireless signals on the multiple wireless carriers.

Handover apparatus 406 further comprises memory 410 for storing instructions configured for facilitating inter-carrier mobility within a wireless network, and a data processor 412 for executing modules to implement the instructions.

Particularly, handover apparatus 406 can comprise an acquisition module 414 that tunes the wireless communication interface 408 to an acquisition channel provided by base station 404 to obtain a cell selection data set 416 relevant to mobile handover decisions involving a non-serving carrier (not depicted). In at least one aspect, acquisition module 414 tunes to the acquisition channel upon receiving a command from a serving base station operating on a serving carrier. Generally, the acquisition channel is a serving channel on the serving carrier. But in some alternative aspects, at least a portion of cell selection data set 416 can be obtained on a non-serving channel on the non-serving carrier.

Different types of physical channels can be employed for the acquisition channel. For instance, the acquisition channel comprises a pilot channel, a control channel, a broadcast channel, a preamble channel, a data channel, or a suitable combination thereof in at least one aspect of the subject disclosure. As more specific examples, the acquisition channel can be a pilot channel that comprises a synchronization channel or a beacon channel, or a control channel that comprises a physical downlink channel such as a physical downlink control channel (PDCCH). In still other examples, the acquisition channel can be a broadcast channel or preamble channel that comprises a physical broadcast channel, or a data channel that comprises a physical downlink shared channel. Other suitable examples can exist as well, for various wireless access systems.

Further to the above, handover apparatus 406 can comprise a decision module 418 that employs the cell selection data set 416 at least in part for determining whether to perform a handover from a serving carrier to the non-serving carrier. The determination can be based exclusively on information included within the cell selection data set 416, or can be based on such information in conjunction with one or more downlink signal measurements of the non-serving carrier performed by UE 402. In the former case, according to a particular aspect of the subject disclosure, the cell selection data set 416 at least in part includes a handover command from a serving base station (e.g., base station 404) instructing UE 402 to perform the handover to the non-serving carrier. This handover command can be based on analysis performed by the serving base station that indicates a condition pertaining to a wireless channel of the non-serving carrier is met. This condition can be an absolute condition pertaining to the non-serving carrier, for instance, or a relative condition comparing at least the non-serving carrier to a serving carrier employed by the serving base station. In the latter case, handover apparatus 406 can employ the cell selection data set 416 at least in part to perform a mobile-initiated handover to the non-serving carrier, as is discussed in more detail below at FIG. 5, infra.

Figure 5:
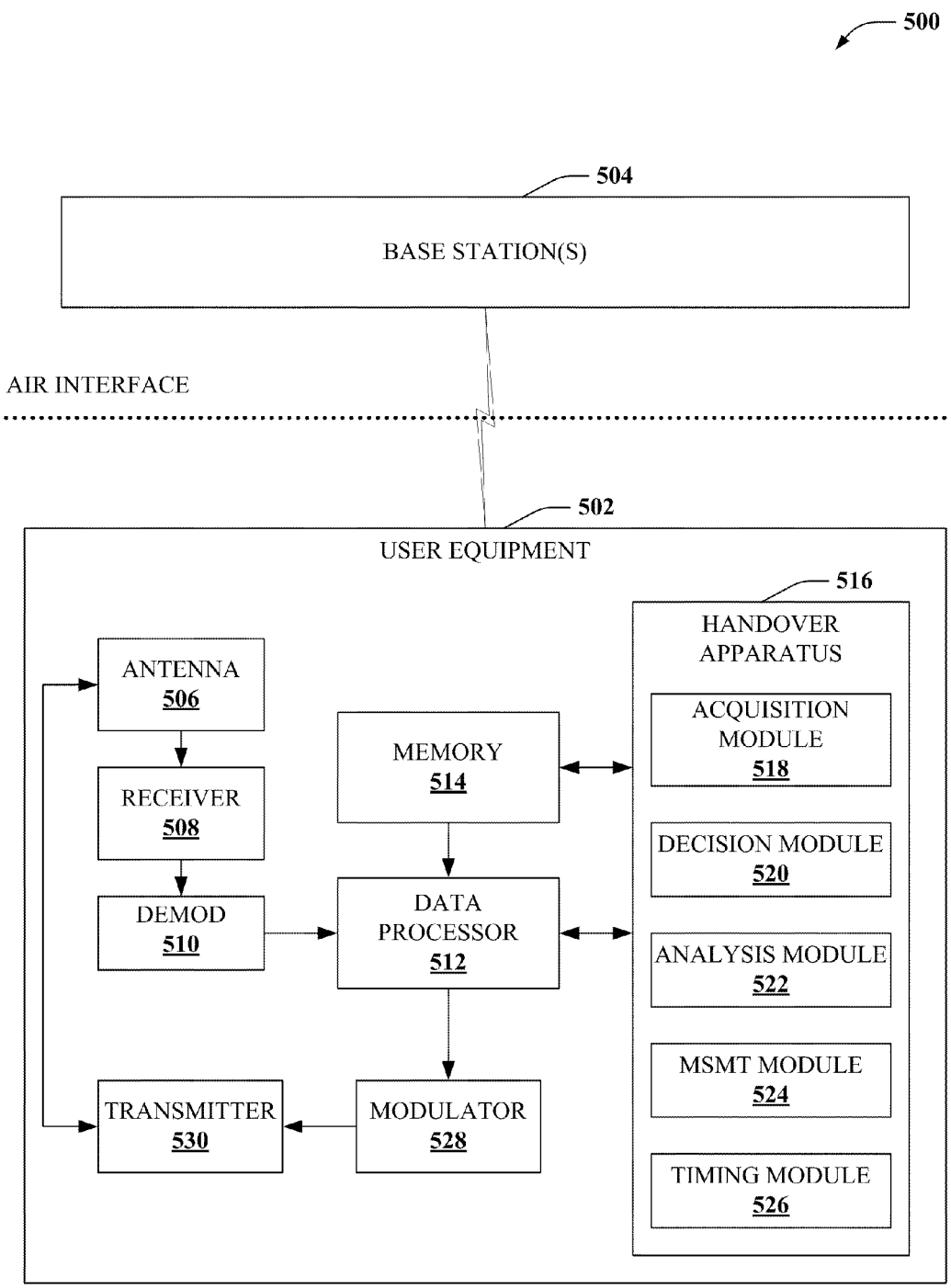
FIG. 5 illustrates a block diagram of an example wireless system for mobile-assisted association in an inter-carrier deployment.

FIG. 5 illustrates a block diagram of an example system 500 comprising a UE 502 communicatively coupled with one or more base stations 504 over a wireless communication interface. Base station(s) 504 transmits on DL subframes of a serving carrier frequency, whereas UE 502 responds on UL subframes of the serving carrier frequency. Further, UE 502 can be configured to obtain mobility-related information pertaining to an additional carrier frequency employed by one or more additional base stations (not depicted) in a vicinity of base station(s) 504. Particularly, the additional carrier frequency is not employed by base station(s) 504 for access communication with UE 502, and as such is a non-serving carrier, or neighboring carrier, or the like.

UE 502 includes at least one antenna 506 (e.g., comprising one or more input/output interfaces) that receives a signal and receiver(s) 508, which performs typical actions (e.g., filters, amplifies, down-converts, etc.) on the received signal. In general, antenna 506 and a transmitter 530 (collectively referred to as a transceiver) can be configured to facilitate wireless data exchange with home BS(s) 504. Further, antenna 506, transmitter 530, receiver 508, demodulator 510 and modulator 528 can be employed as a wireless communication interface by various components of UE 502, including data processor 512 and a handover apparatus 516.

Antenna 506 and receiver(s) 508 can also be coupled with a demodulator 510 that can demodulate received symbols and provide such signals to a data processor(s) 512 for evaluation. It should be appreciated that data processor(s) 512 can control and/or reference one or more components (antenna 506, receiver 508, demodulator 510, memory 514, handover apparatus 516, modulator 528, transmitter 530) of UE 502. Further, data processor(s) 512 can execute one or more modules, applications, engines, or the like that comprise information or controls pertinent to executing functions of UE 502.

Additionally, memory 514 of UE 502 is operatively coupled to data processor(s) 512. Memory 514 can store data to be transmitted, received, and the like, and instructions suitable to conduct wireless communication with a remote device (e.g., base station(s) 504). Specifically, the instructions can be utilized to facilitate inter-carrier mobility in a wireless network. Further, although not depicted, memory 514 can store the modules, applications, engines, etc. (e.g., acquisition module 518, decision module 520, analysis module 522, measurement module 524, timing module 526) associated with handover apparatus 516 and executed by processor(s) 512, above.

According to particular aspects, UE 502 can comprise a handover apparatus 516 that facilitates inter-carrier handover determinations pertaining to one or more non-serving carrier frequencies. These determinations can be made at least in part by obtaining data pertaining to the non-serving carrier frequency (or frequencies) on a serving carrier frequency provided by base station(s) 504. In one aspect, the data can comprise a command to conduct a handover to a non-serving carrier. In another aspect, the data can comprise information employed by UE 502 to determine whether to handover to the non-serving carrier. In yet another aspect, the data can comprise information that, coupled with other information or measurements performed by UE 502, facilitate the determination to conduct the handover. Further, in one aspect, handover apparatus 516 can be substantially similar to handover apparatus 406 of FIG. 4, supra. However, the subject disclosure is not limited to this aspect.

Handover apparatus 516 can comprise an acquisition module 518 that obtains a cell selection data set relevant to mobile handover decisions involving a non-serving carrier, and a decision module 520 that employs the cell selection data set at least in part for determining whether to perform a handover from a serving carrier to the non-serving carrier. To implement this determination, handover apparatus 516 can comprise a measurement module 524 that analyzes a characteristic of a wireless channel of the non-serving carrier to determine if a condition for handover is met. If the condition for handover is met, decision module 520 determines to perform the handover. Otherwise, UE 502 maintains a link with base station(s) 504 and does not perform the handover to the non-serving carrier. In one aspect of the subject disclosure, the condition for handover is met based on analysis of a downlink signal of the wireless channel performed by measurement module 524. A result of this analysis can be used to determine if the characteristic of the wireless channel exceeds a threshold value (which can be a predetermined absolute value, or a relative value based on a characteristic of the serving carrier). As suitable examples, this characteristic can comprise a transmit energy of a downlink signal of the wireless channel, pathloss of the wireless channel, effective geometry of the wireless channel, projected data rate of the wireless channel, or control channel reliability of the wireless channel, or a suitable combination thereof Which characteristic is to be analyzed can be specified as part of the cell selection data set received by acquisition module 518, or can be forwarded to UE 502 by base station(s) 504 upon first entering a wireless network, and stored in memory 514 for subsequent analysis.

In another aspect of the subject disclosure, handover apparatus 516 can comprise an analysis module 522 that computes the characteristic of the wireless channel of the non-serving carrier based at least in part on information included in the cell selection data set. This computation can be in lieu of, or in conjunction with, the analysis of the characteristic of the wireless channel performed by measurement module 524. Particularly, analysis module 522 can extract a subset of data from the cell selection data set that pertains to the non-serving carrier. This subset can comprise various types of data, examples of which can include cell or carrier loading information, power class information, CSG information, anchor carrier information, full or partial cell identity, number of, or identifier for, the non-serving carrier or a subband, a channel or a HARQ interlace thereof on an uplink or a downlink, a fraction of resources allocated to a typical mobile terminal on the non-serving carrier, interference level for the non-serving carrier or the subband, the channel or the HARQ interlace thereof, a data rate on the downlink or the uplink, a QoS guarantee, a backhaul bandwidth, an effective isotropic radiated power, a maximum power amplifier output power, a receiver noise figure, or a base station battery power level, or other information pertaining to cell acquisition or cell selection on the non-serving carrier, or a suitable combination thereof According to still other aspects, handover apparatus 516 can comprise a timing module 526. Timing module 526 can be configured to initiate periodic receipt of non-serving carrier data, analysis thereof, and associated handover determinations. Particularly, timing module 526 can be configured to be a module that instructs acquisition module 518 to tune to an acquisition channel specified by base station(s) 504 at a specific period associated with the non-serving carrier to receive updated non-serving carrier data. This period can be specified by base station(s) 504 as well, or relayed by base station(s) 504 over layer two or layer three signaling established by wireless network specifications. Further, timing module 526 can initiate analysis module 522 or measurement module 524 to analyze non-serving carrier data, or perform non-serving channel measurements, respectively, to assist decision module 520 in performing a handover determination, as discussed above.

The aforementioned systems, wireless communication environments, or apparatuses have been described with respect to interaction between several components, modules and/or communication interfaces. It should be appreciated that such systems and components/modules/interfaces can include those components/modules or sub-modules specified therein, some of the specified components/modules or sub-modules, and/or additional components/modules. For example, a wireless communication system could include non-serving base station 108, serving base station 202 comprising inter-carrier mobility apparatus 208, and UE 502 comprising handover apparatus 516, or a different combination of these or other entities. Sub-modules could also be implemented as modules communicatively coupled to other modules rather than included within parent modules. Additionally, it should be noted that one or more modules could be combined into a single module providing aggregate functionality. For instance, acquisition module 218 can include broadcast module 220, or vice versa, to facilitate obtaining cell acquisition data pertaining to a non-serving carrier and transmitting at least a subset of that data by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 6-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 6:
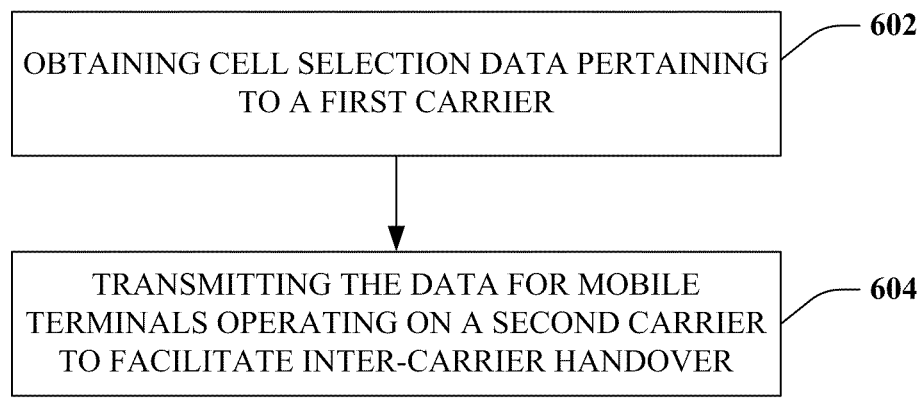
FIG. 6 depicts a flowchart of an example methodology for inter-carrier association according to one or more aspects.

FIG. 6 illustrates a flowchart of an example methodology 600 according to one or more disclosed aspects. At 602, method 600 can comprise obtaining cell selection data pertaining to a first carrier frequency (e.g., a non-serving carrier) employed by a base station to serve mobile terminals operating on the first carrier frequency. At 604, method 600 can comprise transmitting the cell selection data for mobile terminals operating on a second carrier frequency (e.g., a serving carrier) employed by a second base station, to facilitate inter-carrier handover determinations pertaining to the first carrier frequency. It should be appreciated that the cell selection data can include various data relevant to mobility decisions from the second carrier frequency and the first carrier frequency for the mobile terminals as described herein. These mobility decisions can be determined by the second base station, or determined at the mobile terminals themselves.

In some aspects of the subject disclosure, transmitting cell selection data further comprises transmitting the cell selection data on a channel of the first carrier frequency that mobile terminals operating on the second carrier frequency are configured to acquire. In this case, transmitting the cell selection data can be preceded by transmitting an order to tune to the first carrier frequency, so that the mobile terminals are configured to receive the transmission. In other aspects, transmitting cell selection data further comprises tuning a wireless transceiver of the base station to the second carrier frequency and transmitting the cell selection data on the second carrier frequency. In at least one particular aspect, transmitting the cell selection data further comprises employing a channel of the first carrier frequency or of the second carrier frequency utilized for inter-carrier cell selection data. As examples, the transmitting comprises employing a pilot channel, a control channel, a broadcast channel, a preamble channel or a data channel for the transmitting, or a suitable combination thereof. In another aspect, the channel comprises a low reuse channel that transmits with a distinct periodicity assigned to the first carrier frequency. In this case, an order can be sent for the mobile terminals to tune to the low reuse channel, or the second base station can simply provide the periodicity and an identity of the low reuse channel to the mobile terminals, which can then monitor the low reuse channel at the provided periodicity.

In at least one aspect, the second base station employing the second carrier frequency can facilitate handover decisions for the mobile terminals operating on the first carrier frequency. In this case, method 600 can further comprise receiving cell selection data pertaining to the second carrier frequency from one of the mobile terminals operating on the first carrier frequency. Further, method 600 can comprise computing, or obtaining from the one of the mobile terminals, a transmit energy metric, a pathloss metric, an effective geometry metric, a projected data rate metric, or a control channel reliability metric, or a suitable combination thereof, pertaining to the first carrier frequency, as well as computing a similar metric pertaining to the second carrier frequency. Based on either or both of these metrics, method 600 can further comprise determining whether the one of the mobile terminals operating on the first carrier frequency should conduct a handover to the second carrier frequency.

Figure 7:
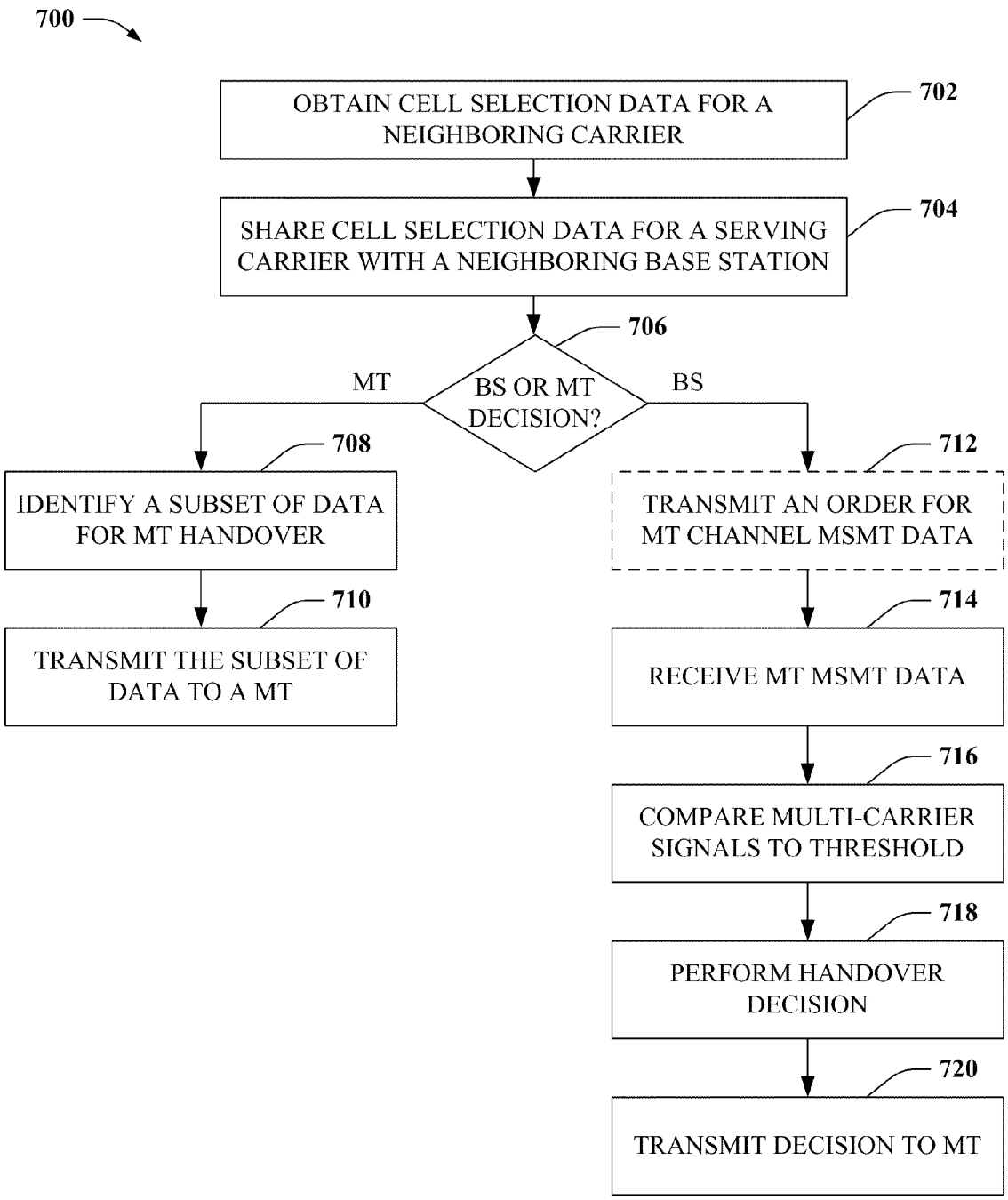
FIG. 7 illustrates a flowchart of a sample methodology for supporting mobility in a multi-carrier heterogeneous network deployment.

FIG. 7 depicts a flowchart of a sample methodology 700 for facilitating inter-carrier handover determinations according to further aspects of the subject disclosure. At 702, method 700 can comprise obtaining cell selection data for a neighboring carrier, which is different from a serving carrier. At 704, method 700 can comprise sharing cell selection data for the serving carrier with a neighboring base station operating on the neighboring carrier. At 706, a determination is made as to whether handover determinations for a mobile terminal operating on the serving carrier are network directed or mobile directed. For mobile directed handover determinations, method 700 can proceed to 708; otherwise method 700 proceeds to 712.

At 708, method 700 can comprise identifying a subset of cell selection data for the neighboring carrier that is pertinent to the mobile terminal operating on the serving carrier. At 710, method 700 can comprise transmitting the subset of the cell selection data to the mobile carrier to facilitate a mobile directed handover determination for the mobile device. By identifying and transmitting the subset of cell selection data for the neighboring carrier, method 700 can reduce or avoid a need for the mobile terminal to tune away to the neighboring carrier to conduct the handover determination. This can reduce battery consumption associated with tuning away to the neighboring carrier, as well as gaps in signal measurements on the serving carrier.

At 712, method 700 can optionally transmit an order for the mobile terminal to perform a channel measurement on the neighboring carrier. Alternatively, method 700 can operate under an assumption that the mobile will conduct the channel measurement without the order. At 714, method 700 can comprise receiving measurement data resulting from the channel measurement performed by the mobile terminal At 716, method 700 can comprise comparing the measurement data to a threshold value, or in an alternative aspect, determining whether a metric of the neighboring carrier exceeds a similar metric of the serving carrier by a threshold amount. At 718, method 700 can comprise performing a handover decision based at least in part on the measurement data. At 720, method 700 can comprise transmitting a handover command to the mobile terminal if the measurement data exceeds the threshold value, or the metric of the serving carrier exceeds the similar metric of the serving carrier by the threshold amount.

Figure 8:
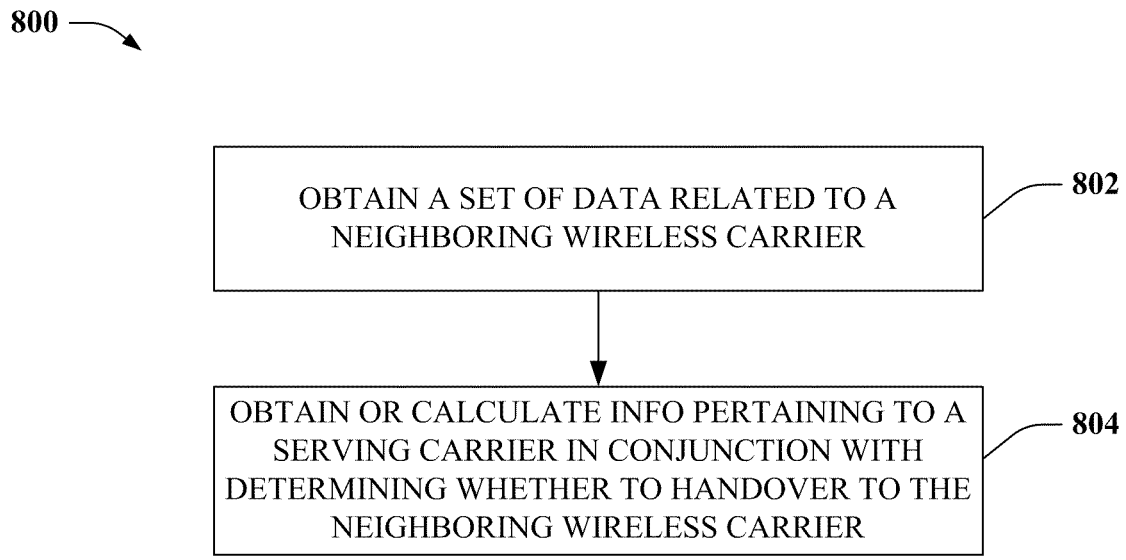
FIG. 8 depicts a flowchart of a sample methodology for terminal mobility in a multi-carrier wireless deployment according to specific aspects.

FIG. 8 illustrates a flowchart of an example methodology 800 for implementing an inter-carrier handover determination in mobile communications. At 802, method 800 can comprise obtaining a set of data related to a neighboring wireless carrier. In one particular aspect of the subject disclosure, obtaining the set of data can further comprise employing a periodicity associated with transmission of the set of data (e.g., by a serving base station) in conjunction with obtaining the set of data. The periodicity can be utilized, for instance, to identify a low reuse channel (e.g., a low reuse preamble) on which the set of data is transmitted by the serving base station.

Further, at 804, method 800 can comprise obtaining, or employing a data processor to calculate, quality or performance information pertaining to a serving wireless carrier utilized by a mobile device in conjunction with determining whether to handover from the serving wireless carrier to the neighboring wireless carrier. In one aspect, obtaining the quality or performance information comprises tuning to a predetermined channel on the serving wireless carrier assigned for inter-carrier information. In an alternative aspect, obtaining the quality or performance information further comprises tuning to the neighboring wireless carrier to obtain at least a subset of the set of data. In this latter aspect, obtaining the quality or performance information can further comprise analyzing a downlink signal of the neighboring wireless carrier and comparing the downlink signal of the neighboring wireless carrier to a downlink signal of the serving wireless carrier. In one example, tuning to the neighboring wireless carrier further comprises tuning to a predetermined channel of the neighboring wireless carrier assigned for inter-carrier information. In one particular aspect of this example, tuning to the predetermined channel of the neighboring wireless carrier further comprises receiving a command from a serving base station to perform the tuning.

In one or more other aspects of the subject disclosure, method 800 can additionally comprise employing the set of data to acquire a quality or performance information set pertaining to the neighboring wireless carrier at least in part to determine whether to conduct a handover from the serving wireless carrier to the neighboring wireless carrier. As one example, employing the set of data to acquire the quality or performance information set further comprises calculating a transmit energy metric, a pathloss, an effective geometry, a projected data rate or a control channel reliability metric pertaining to the neighboring wireless carrier. According to this example, method 800 further comprises determining whether to conduct a handover to the neighboring wireless carrier at least in part based on results of the calculating. In an alternative example, method 800 instead comprises forwarding the set of data to a serving base station for analysis of the neighboring wireless carrier and comparison with the serving wireless carrier. According to this alternative example, method 800 further comprises obtaining an instruction to perform the handover to the neighboring wireless carrier in response to forwarding the set of data.

Figure 9:
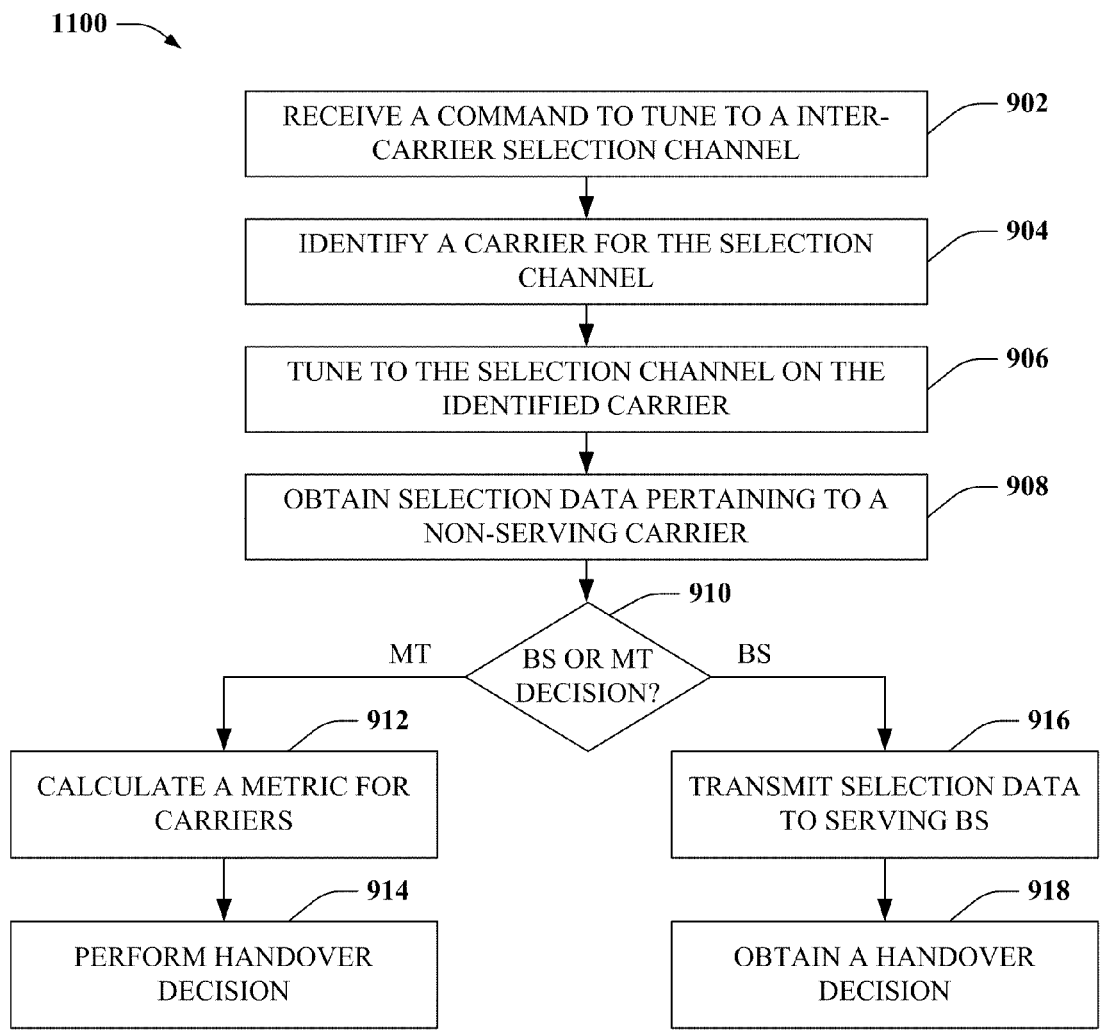
FIG. 9 illustrates a flowchart of an example methodology for mobile-assisted association or handover for a multi-carrier deployment in other aspects.

FIG. 9 illustrates a flowchart of an example methodology 900 for performing an inter-carrier handover determination according to still other aspects of the subject disclosure. At 902, method 900 can comprise receiving a command to tune to an inter-carrier selection channel for the inter-carrier handover determination. At 904, method 900 can comprise identifying a carrier on which the inter-carrier selection channel is established. In one aspect, the carrier can be a carrier employing by a serving base station for mobile access communications. In another aspect, however, the carrier can be a separate carrier utilized by the serving base station specifically for the inter-carrier selection channel.

At 906, method 900 can comprise tuning to the inter-carrier selection channel on the identified carrier. At 908, method 900 can obtain cell selection data pertaining to a non-serving carrier employed by a base station other than the serving base station. It should be appreciated that the non-serving carrier is different from the carrier employed by the serving base station for mobile access communications, but in at least one aspect, can be the separate carrier utilized by the serving base station specifically for the inter-carrier selection channel. At 910, a determination is made as to whether inter-carrier handover decisions are network initiated or mobile initiated. If mobile initiated, method 900 can proceed to 912. Otherwise, method 900 proceeds to 916.

At 912, method 900 can comprise calculating a downlink signal metric for the non-serving carrier, and optionally calculating a second downlink signal metric for the carrier employed by the serving base station for mobile access communications. At 914, a handover decision is made based at least in part on the downlink signal metric calculated for the non-serving carrier. In one instance, the handover decision can be based on comparison of the downlink signal metric for the non-serving carrier relative a predetermined threshold. In another instance, the handover decision can be based at least in part on comparison of this downlink signal metric and the second downlink signal metric.

At 916, method 900 can comprise transmitting the cell selection data pertaining to the non-serving carrier to the serving base station. Optionally, method 900 can additionally comprise transmitting a downlink signal metric pertaining to the non-serving carrier in conjunction with the cell selection data. At 918, method 900 can comprise obtaining a handover decision for the non-serving carrier from the serving base station. Based on the handover decision, method 900 can then comprise performing a handover to the non-serving carrier, or remaining on the serving carrier instead.

Figure 10:
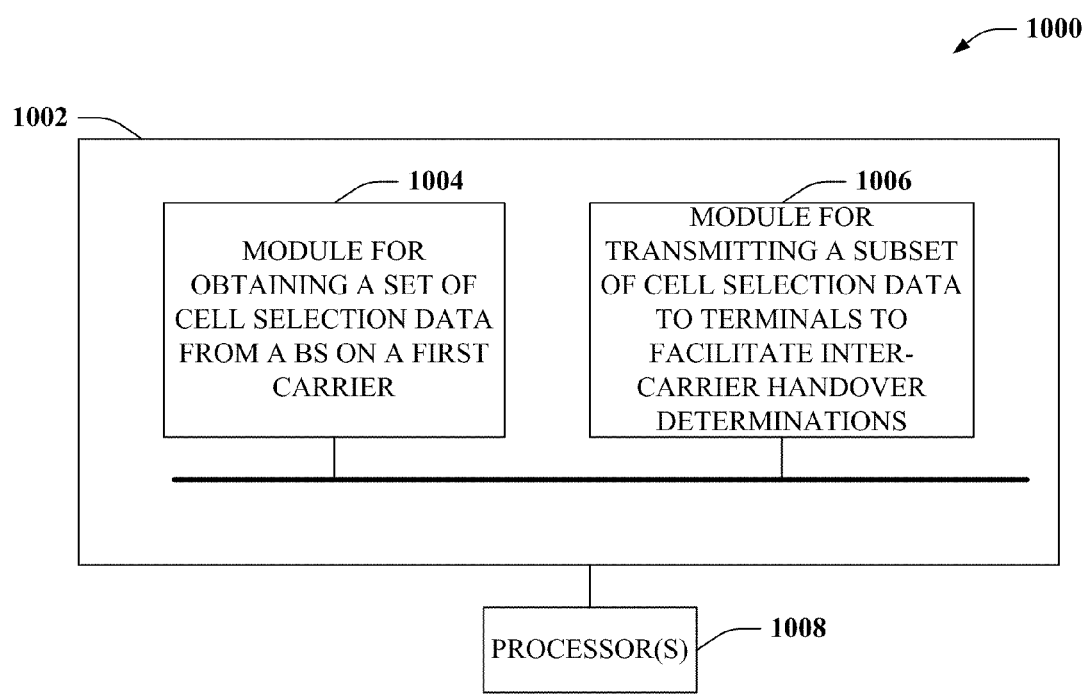
FIG. 10 depicts a block diagram of an example electronic apparatus that provides inter-carrier association for heterogeneous deployments.
Figure 11:
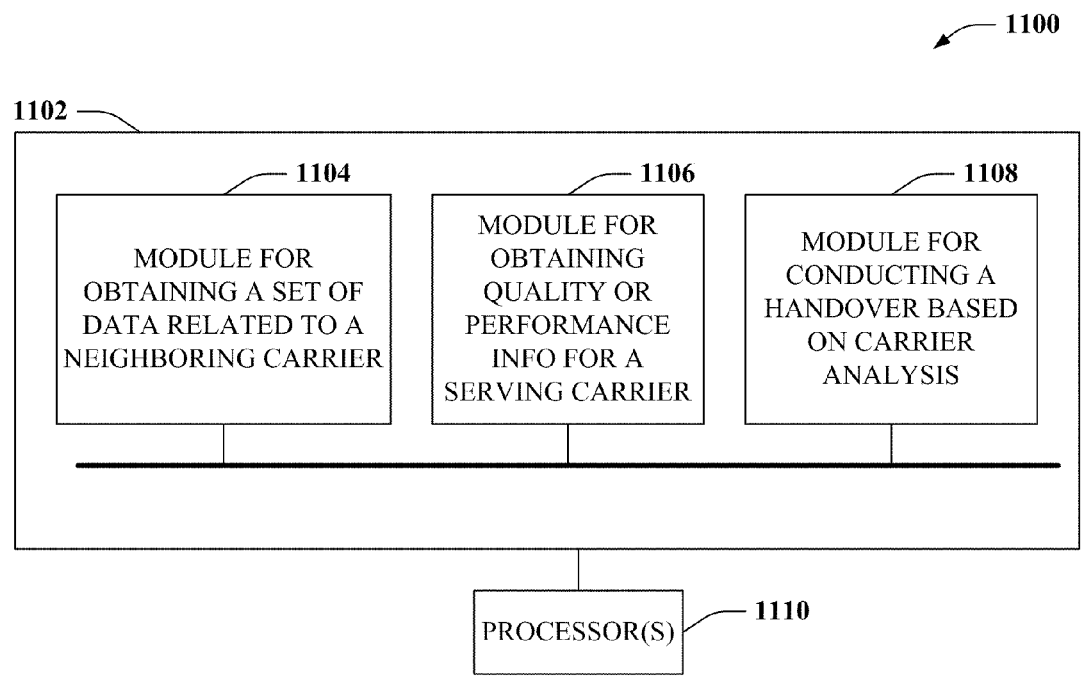
FIG. 11 illustrates a block diagram of a sample electronic apparatus that provides mobile-assisted association or handover in a multi-carrier environment.

FIGS. 10 and 11 illustrate respective example apparatuses 1000, 1100 configured to facilitate wireless communication for a local IP network, according to aspects of the subject disclosure. For instance, apparatuses 1000, 1100 can reside at least partially within a wireless communication network and/or within a wireless receiver such as a node, base station, access point, user terminal, personal computer coupled with a mobile interface card, or the like. It is to be appreciated that apparatuses 1000, 1100 are represented as including functional blocks, which can be functional blocks that represent functions implemented by a processor, software, or combination thereof (e.g., firmware).

Apparatus 1000 comprises memory 1002 for storing instructions or modules configured to implement features of apparatus 1000, including facilitating inter-carrier handover determinations for mobile terminals coupled to a wireless network, and a processor 1008 for executing those instructions or modules. Specifically, apparatus 1000 can comprise a module 1004 for obtaining a set of cell selection data from a first base station operating on a first carrier frequency. Module 1004 can include, for instance, a wired or wireless interface for communication over a wired or wireless link with the first base station to receive the set of cell selection data. Additionally, apparatus 1000 can comprise a module 1006 for transmitting at least a subset of the set of cell selection data to mobile terminals operating on a second carrier frequency employed by a second base station, to facilitate inter-carrier handover determinations pertaining to the first carrier frequency. In at least one aspect of the subject disclosure, apparatus 1000 can be included as part of the second base station to obtain the set of cell selection data, and transmit the subset of the set of cell selection data to the mobile terminals. In another aspect, apparatus 1000 can be communicatively coupled with the second base station (e.g., as part of a base station controller associated with the second base station) and transmit and receive data with the second base station via a communication link coupling apparatus 1000 and the second base station.

Apparatus 1100 comprises memory 1102 for storing instructions or modules for implementing features of apparatus 1100, including performing or facilitating inter-carrier mobility functions of a mobile terminal, and a processor 1110 for executing those instructions or modules. In addition, apparatus 1100 can comprise a module 1104 for obtaining a set of data related to a neighboring wireless carrier. The neighboring wireless carrier can comprise, for instance, a non-serving carrier employed by a base station other than a base station serving the mobile terminal (a serving base station). Further, module 1104 can obtain the set of data by tuning a wireless communication interface of the mobile terminal to a serving wireless carrier employed by the serving base station, or by tuning the wireless communication interface to a predetermined inter-carrier selection channel specified by the serving base station. Additionally, apparatus 1100 can comprise a module 1106 for obtaining quality or performance information pertaining to the serving wireless carrier. In one aspect, module 1106 can be configured to analyze downlink signals of the serving wireless carrier, and derive the quality or performance information for the downlink signal analysis. In another aspect, the quality or performance information can be transmitted to the mobile terminal over the inter-carrier selection channel. Additionally, apparatus 1100 can comprise a module 1108 for conducting a handover from the serving wireless carrier to the neighboring wireless carrier based on analysis of the neighboring wireless carrier and the serving wireless carrier.

Figure 12:
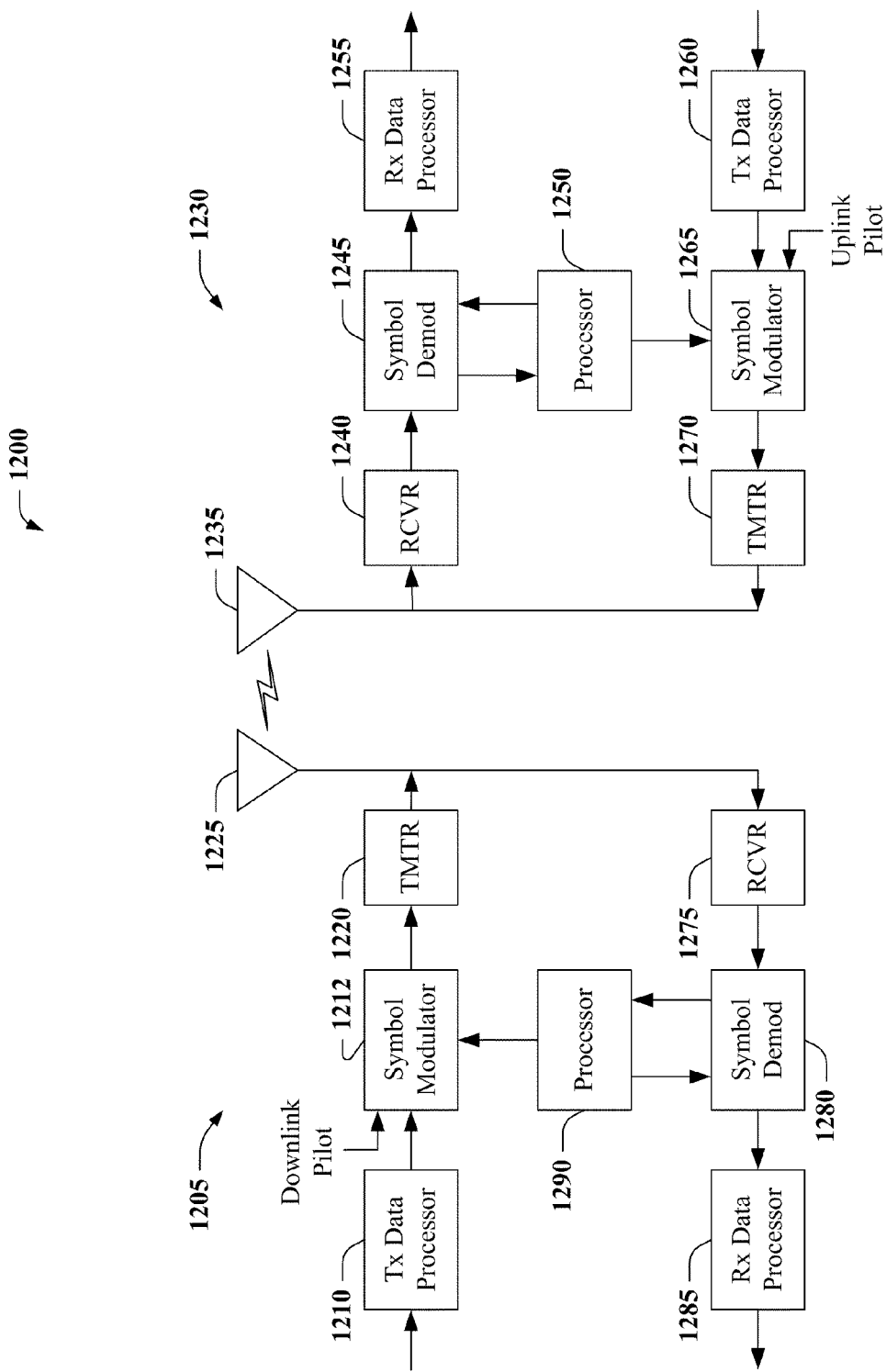
FIG. 12 depicts a block diagram of a sample wireless communications apparatus that can implement various aspects of the subject disclosure.

FIG. 12 depicts a block diagram of an example system 1200 that can facilitate wireless communication according to some aspects disclosed herein. On a DL, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. A symbol modulator 1215 multiplexes data and pilot symbols and provides them to a transmitter unit (TMTR) 1220. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1220 receives and converts the stream of symbols into one or more analog signals and further conditions (e.g., amplifies, filters, and frequency upconverts) the analog signals to generate a DL signal suitable for transmission over the wireless channel. The DL signal is then transmitted through an antenna 1225 to the terminals. At terminal 1230, an antenna 1235 receives the DL signal and provides a received signal to a receiver unit (RCVR) 1240. Receiver unit 1240 conditions (e.g., filters, amplifies, and frequency downconverts) the received signal and digitizes the conditioned signal to obtain samples. A symbol demodulator 1245 demodulates and provides received pilot symbols to a processor 1250 for channel estimation. Symbol demodulator 1245 further receives a frequency response estimate for the DL from processor 1250, performs data demodulation on the received data symbols to obtain data symbol estimates (which are estimates of the transmitted data symbols), and provides the data symbol estimates to an RX data processor 1255, which demodulates (i.e., symbol demaps), deinterleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the UL, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an UL signal, which is transmitted by the antenna 1235 to the access point 1205. Specifically, the UL signal can be in accordance with SC-FDMA requirements and can include frequency hopping mechanisms as described herein.

At access point 1205, the UL signal from terminal 1230 is received by the antenna 1225 and processed by a receiver unit 1275 to obtain samples. A symbol demodulator 1280 then processes the samples and provides received pilot symbols and data symbol estimates for the UL. An RX data processor 1285 processes the data symbol estimates to recover the traffic data transmitted by terminal 1230. A processor 1290 performs channel estimation for each active terminal transmitting on the UL. Multiple terminals can transmit pilot concurrently on the UL on their respective assigned sets of pilot sub-bands, where the pilot sub-band sets can be interlaced.

Processors 1290 and 1250 direct (e.g., control, coordinate, manage, etc.) operation at access point 1205 and terminal 1230, respectively. Respective processors 1290 and 1250 can be associated with memory units (not shown) that store program codes and data. Processors 1290 and 1250 can also perform computations to derive frequency and time-based impulse response estimates for the UL and DL, respectively.

For a multiple-access system (e.g., SC-FDMA, FDMA, OFDMA, CDMA, TDMA, etc.), multiple terminals can transmit concurrently on the UL. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal.

The techniques described herein can be implemented by various means. For example, these techniques can be implemented in hardware, software, or a combination thereof For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof With software, implementation can be through modules (e.g., procedures, functions, and so on) that perform the functions described herein. The software codes can be stored in memory unit and executed by the processors 1290 and 1250.

Figure 13:
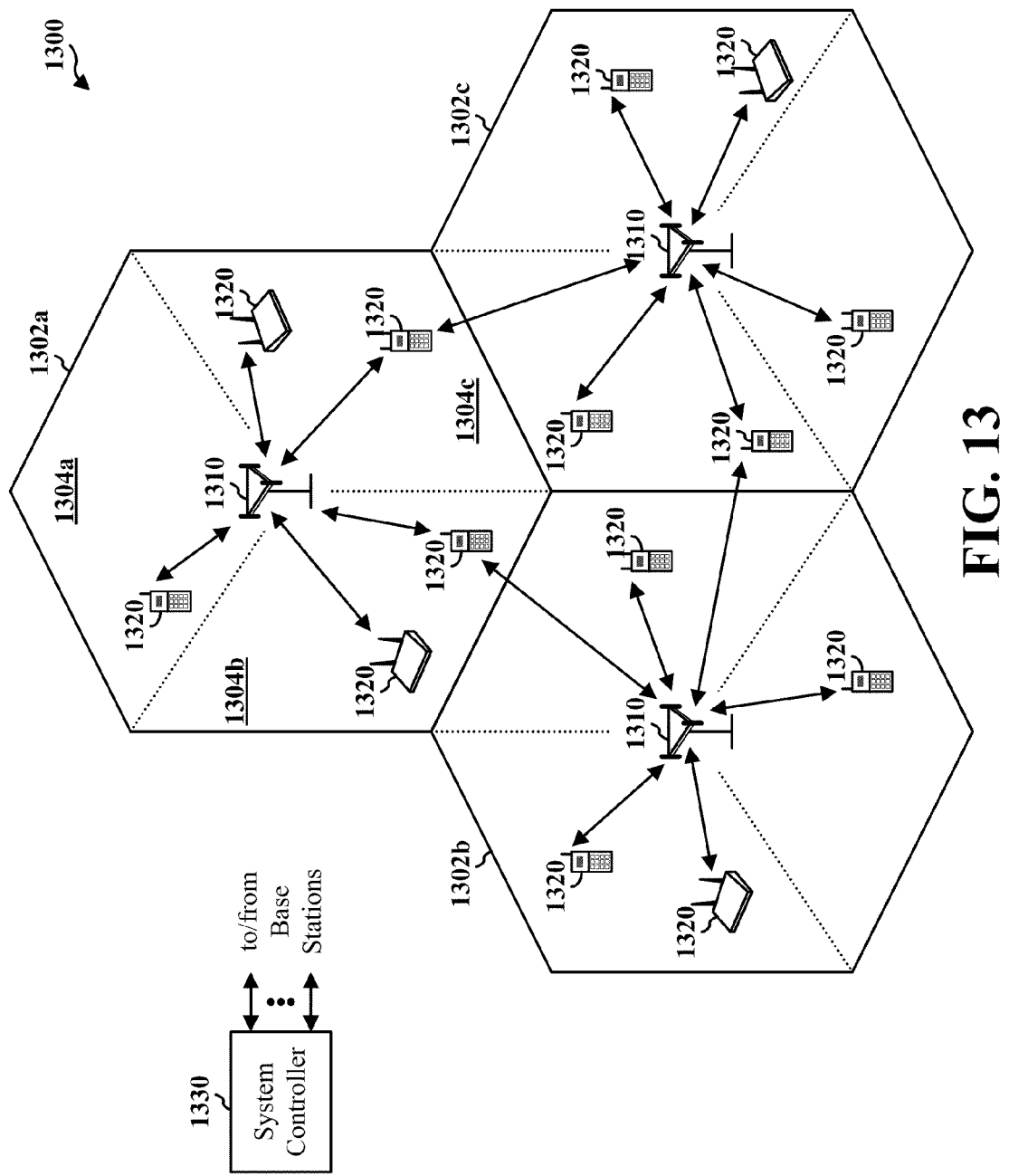
FIG. 13 illustrates a block diagram of a sample cellular environment for wireless communications according to further aspects.

FIG. 13 illustrates a wireless communication system 1300 with multiple base stations 1310 (e.g., wireless access points, wireless communication apparatus) and multiple terminals 1320 (e.g., ATs), such as can be utilized in conjunction with one or more aspects. A base station 1310 is generally a fixed station that communicates with the terminals and can interchangeably be called an access point, a Node B, or some other terminology, except where a particular term is implied by surrounding context. Each base station 1310 provides communication coverage for a particular geographic area or coverage area, illustrated as three geographic areas in FIG. 13, labeled 1302*a*, 1302*b*, and 1302*c*. The term "cell" can refer to a BS or its coverage area depending on the context in which the term is used. To improve system capacity, a BS geographic area/coverage area can be partitioned into multiple smaller areas (e.g., three smaller areas, according to cell 1302*a* in FIGS. 13), 1304*a*, 1304*b*, and 1304*c*. Each smaller area (1304*a*, 1304*b*, 1304*c*) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1320 are typically dispersed throughout the system, and each terminal 1320 can be fixed or mobile. Terminals 1320 can also be called a mobile station, user equipment, a user device, wireless communication apparatus, an access terminal, a user terminal or some other terminology. A terminal 1320 can be a wireless device, a cellular phone, a personal digital assistant (PDA), a wireless modem card, and so on. Each terminal 1320 can communicate with zero, one, or multiple base stations 1310 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1330 couples to base stations 1310 and provides coordination and control for base stations 1310. For a distributed architecture, base stations 1310 can communicate with one another as needed (e.g., by way of a wired or wireless backhaul network communicatively coupling the base stations 1310). Data transmission on the forward link often occurs from one access point to one access terminal at or near the maximum data rate that can be supported by the forward link or the communication system. Additional channels of the forward link (e.g., control channel) can be transmitted from multiple access points to one access terminal Reverse link data communication can occur from one access terminal to one or more access points.

Figure 14:
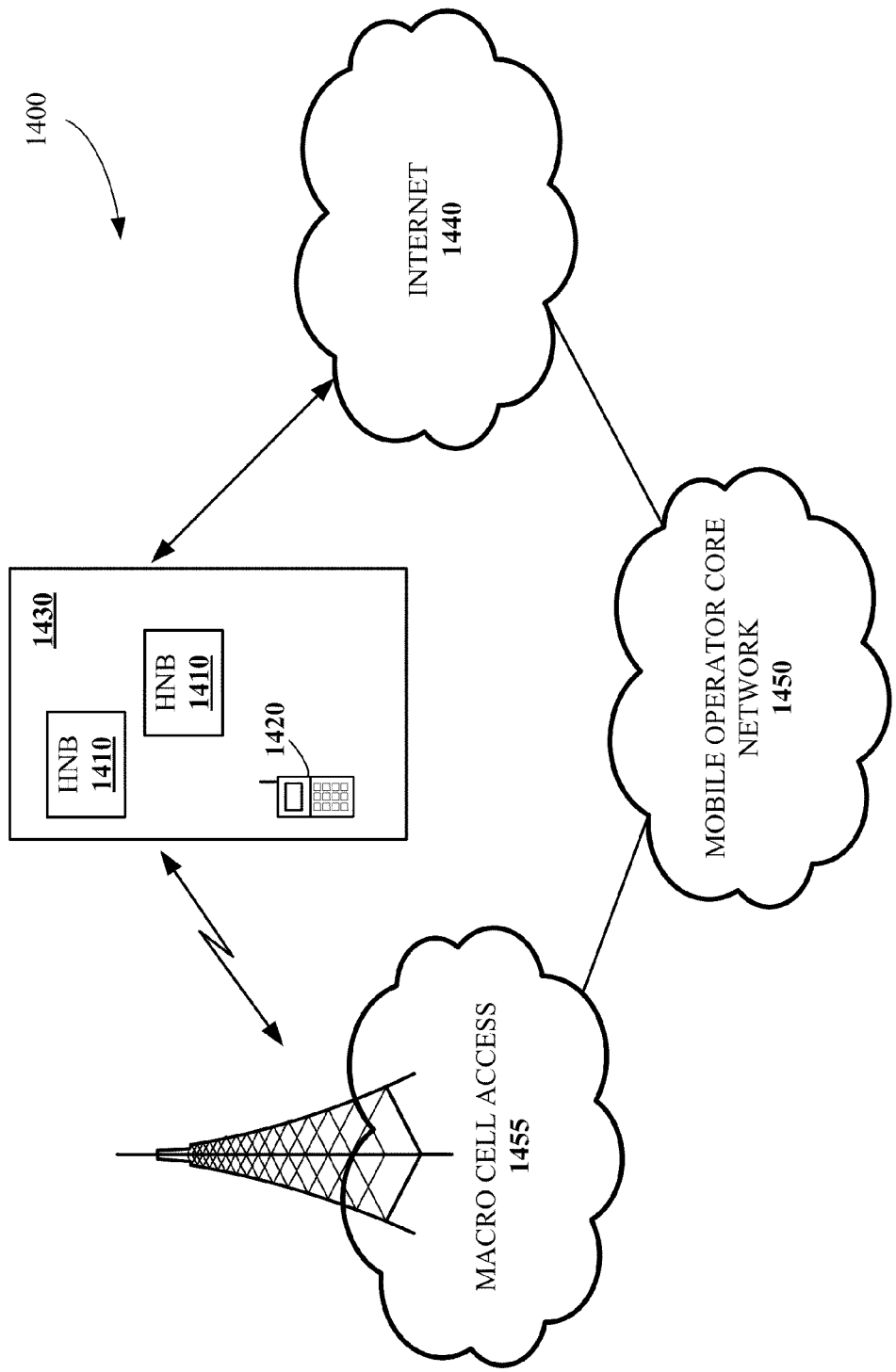
FIG. 14 illustrates an exemplary communication system enabling deployment of access point base stations within a network environment.

FIG. 14 is an illustration of a planned or semi-planned wireless communication environment 1400, in accordance with various aspects. Wireless communication environment 1400 includes multiple access point BSs including HNBs 1410, each of which are installed in corresponding small scale network environments. Examples of small scale network environments can include user residences, places of business, indoor/outdoor facilities 1430, and so forth. The HNBs 1410 can be configured to serve associated UEs 1420 (e.g., included in a CSG associated with HNBs 1410), or optionally alien or visitor UEs 1420 (e.g., that are not configured for the CSG of the HNB 1410). Each HNB 1410 is further coupled to the Internet 1440 and a mobile operator core network 1450 via a DSL router (not shown), or, alternatively, a cable modem, broadband over power line connection, satellite Internet connection, or a like broadband Internet connection (not shown).

To implement wireless services via HNBs 1410, an owner of the HNBs 1410 subscribes to mobile service, such as 3G mobile services, offered through the mobile operator core network 1450. Also, the UE 1420 can be capable to operate in a macro cellular environment and/or in a residential small scale network environment, utilizing various techniques described herein. Thus, at least in some disclosed aspects, HNB 1410 can be backward compatible with any suitable existing UE 1420. Furthermore, in addition to a macro cell 1455 of mobile operator core network 1450, UE 1420 can be served by a predetermined number of HNBs 1410, specifically HNBs 1410 that reside within a corresponding user residence(s), place(s) of business, or indoor/outdoor facilities 1430. In some aspects, UE 1420 cannot be in a soft handover state with macro cell 1455 while being served by one or more of HNBs 1410. It should be appreciated that although aspects described herein employ 3GPP terminology, it is to be understood that the aspects can also be applied to 3GPP technology (Release 99 [Rel99], Rel5, Rel6, Rel7), as well as 3GPP2 technology (1×RTT, 1×EV-DO Re0, RevA, RevB) and other known and related technologies.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UE. A UE can also be called a system, a subscriber unit, a subscriber station, mobile station, mobile, mobile communication device, mobile device, remote station, remote terminal, AT, user agent (UA), a user device, or user terminal (UT). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "module" or "apparatus" as used herein is intended to encompass, in at least one aspect, a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of wireless communication, comprising:
   obtaining cell selection data pertaining to a first carrier frequency employed by a first base station to serve mobile terminals operating on the first carrier frequency; and
   transmitting, by a second base station, the cell selection data to mobile terminals operating on a second carrier frequency employed by the second base station, wherein the mobile terminals determine whether to handover to the first carrier frequency based on the cell selection data, wherein a periodicity of transmission of the cell selection data is utilized by the mobile terminals to determine a particular channel on which the cell selection data is transmitted by the second base station and the particular channel comprises a low frequency reuse channel.

2. The method of claim 1, wherein transmitting the cell selection data further comprises employing the second base station for transmitting the cell selection data on the second carrier frequency, or on a channel of the first carrier frequency that mobile terminals operating on the second carrier frequency are configured to acquire.

3. The method of claim 1, wherein transmitting cell selection data further comprises tuning a wireless transceiver of the second base station to the second carrier frequency and transmitting the cell selection data on the second carrier frequency.

4. The method of claim 1, wherein transmitting the cell selection data further comprises transmitting at least one of the following pertaining to the first carrier frequency:
   cell or carrier loading information;
   power class information;
   closed subscriber group information;
   anchor carrier information;
   a full or a partial cell identity;
   number of, or identifier for, the first carrier frequency, or a subband, a channel
   or a hybrid automatic repeat request interlace thereof, on an uplink or a downlink;
   a fraction of resources allocated to a typical mobile terminal on the first carrier frequency;
   interference level for the first carrier frequency, or the subband, the channel or the hybrid automatic repeat request interlace thereof;
   a data rate on the downlink or the uplink;
   a quality of service guarantee;
   backhaul bandwidth;
   effective isotropic radiated power;
   maximum power amplifier output power;
   receiver noise figure; or
   a base station battery power level.

5. The method of claim 1, wherein transmitting the cell selection data further comprises employing a channel of the first carrier frequency or of the second carrier frequency for inter-carrier cell selection data.

6. The method of claim 5, wherein transmitting the cell selection data further comprises employing a pilot channel, a control channel, a broadcast channel, a preamble channel or a data channel.

7. The method of claim 6, wherein at least one of:
   the pilot channel comprises a synchronization channel or a beacon channel;
   the control channel comprises a physical downlink control channel;
   the broadcast channel or the preamble channel comprises a physical broadcast channel; or
   the data channel comprises a physical downlink shared channel.

8. The method of claim 5, wherein the particular channel is assigned to the first carrier frequency.

9. The method of claim 1, further comprising receiving the cell selection data pertaining to the first carrier frequency from one of the mobile terminals operating on the second carrier frequency.

10. The method of claim 9, further comprising computing, or obtaining from one of the mobile terminals, a transmit energy metric, a pathloss metric, an effective geometry metric, a projected data rate metric or a control channel reliability metric pertaining to the first carrier frequency.

11. The method of claim 9, further comprising employing the cell selection data pertaining to the first carrier frequency at least in part for determining whether one of the mobile terminals operating on the second carrier frequency should conduct a handover to the first carrier frequency.

12. An apparatus configured for wireless communication, comprising:
    a communication interface for wired electronic communication and for wireless electronic communication on at least a serving carrier;

memory for storing instructions; and
a data processor for executing modules to implement the instructions, the modules comprising:
an acquisition module that obtains a set of mobility information relevant to mobile handover decisions involving a non-serving carrier, wherein the non-serving carrier and the serving carrier are distinct frequencies within the wireless network; and
a broadcast module that transmits at least a subset of the set of mobility information, wherein a user equipment operating on the serving carrier determines whether to handover to the non-serving carrier based on the subset of the set of mobility information, wherein a periodicity of transmission of the at least the subset of the set of mobility information is utilized by the user equipment to determine a particular channel on which the at least the subset of the set of mobility information is transmitted by the broadcast module and the particular channel comprises a low frequency reuse channel.

13. The apparatus of claim 12, wherein:
the communication interface comprises an electronic interface to a backhaul link coupling a first base station operating on the serving carrier with a second base station operating on the non-serving carrier; and
the acquisition module obtains the set of mobility information from the second base station over the backhaul link.

14. The apparatus of claim 12, wherein the communication interface is configured for wireless communication at least on the non-serving carrier; and further wherein:
the acquisition module obtains the set of mobility information from an uplink transmission on the non-serving carrier; or
the acquisition module obtains the set of mobility information from a non-serving base station on a wireless backhaul link that employs the non-serving carrier.

15. The apparatus of claim 12, further comprising a calculation module that employs at least a second subset of the set of mobility information to compute a metric for a downlink signal on the non-serving carrier.

16. The apparatus of claim 15, wherein the metric of the downlink signal comprises at least one of:
a transmit energy metric indicative of transmit energy of the downlink signal;
a pathloss indicative of channel gain between the user equipment and an entity that transmits the downlink signal;
an effective geometry metric indicative of received quality of the downlink signal at the user equipment;
a projected data rate indicative of an achievable or supported data rate for the user equipment; or
a control channel reliability metric indicative of reliability of control channels on the non-serving carrier.

17. The apparatus of claim 15, further comprising a query module that instructs the user equipment to submit a measurement of the downlink signal.

18. The apparatus of claim 15, wherein the subset of the set of mobility information at least in part comprises the metric of the downlink signal.

19. The apparatus of claim 12, wherein the subset of the set of mobility information includes data pertaining to the non-serving carrier that is employed by the user equipment to compute a metric of a non-serving wireless channel, wherein the metric is utilized by the user equipment in a mobility decision pertaining to the non-serving carrier.

20. The apparatus of claim 12, further comprising a mobility module that employs a metric of the non-serving carrier to determine whether the user equipment should conduct a handover to the non-serving carrier.

21. The apparatus of claim 20, wherein the subset of the set of mobility information at least in part comprises an order to conduct the handover to the non-serving carrier.

22. The apparatus of claim 12, wherein the acquisition module periodically obtains, and the broadcast module periodically transmits, mobility information pertaining to the non-serving carrier at a rate specific to the non-serving carrier.

23. An apparatus configured for wireless communication, comprising:
means for obtaining a set of cell selection data from a first base station operating on a first carrier frequency; and
means for transmitting at least a subset of the set of cell selection data to mobile terminals operating on a second carrier frequency employed by the apparatus, wherein the mobile terminals determine whether to handover to the first carrier frequency based on the subset of the set of cell selection data, wherein a periodicity of transmission of the at least the subset of the set of the cell selection data is utilized by the mobile terminals to determine a particular channel on which the at least the subset of set of the cell selection data is transmitted by the second base station and the particular channel comprises a low frequency reuse channel.

24. At least one processor configured for wireless communication, comprising:
a module for obtaining a set of cell selection data from a first base station operating on a first carrier frequency; and
a module for transmitting, by a second base station, at least a subset of the set of cell selection data to mobile terminals operating on a second carrier frequency employed by the second base station, wherein the mobile terminals determine whether to handover to the first carrier frequency based on the subset of the set of cell selection data, wherein a periodicity of transmission of the at least the subset of the set of the cell selection data is utilized by the mobile terminals to determine a particular channel on which the at least the subset of the set of the cell selection data is transmitted by the second base station and the particular channel comprises a low frequency reuse channel.

25. A computer program product, comprising:
a non-transitory computer-readable medium, comprising:
code for causing a computer to obtain a set of cell selection data from a first base station operating on a first carrier frequency; and
code for causing the computer to transmit, by a second base station, at least a subset of the set of cell selection data to mobile terminals operating on a second carrier frequency employed by the second base station, wherein the mobile terminals determine whether to handover to the first carrier frequency based on the subset of the set of cell selection data wherein a periodicity of transmission of the at least the subset of the set of the cell selection data is utilized by the mobile terminals to determine a particular channel on which the at least the subset of the set of the cell selection data is transmitted by the second base station and the particular channel comprises a low frequency reuse channel.

26. A method of wireless communication, comprising:
obtaining a set of data related to a neighboring wireless carrier from a serving base station;

obtaining, or employing a data processor to calculate, quality or performance information pertaining to a serving wireless carrier utilized by a mobile device served by the serving base station; and determining, by the mobile device, whether to handover from the serving wireless carrier to the neighboring wireless carrier based on the set of data and the quality or performance information, wherein the mobile device utilizes a periodicity of transmission of the set of data to determine a particular channel on which the set of data is transmitted and the particular channel comprises a low frequency reuse channel.

27. The method of claim 26, wherein obtaining the quality or performance information further comprises tuning to a predetermined channel on the serving wireless carrier assigned for inter-carrier information.

28. The method of claim 26, wherein obtaining the quality or performance information further comprises tuning to the neighboring wireless carrier to obtain at least a subset of the set of data.

29. The method of claim 28, further comprising tuning to a predetermined channel of the neighboring wireless carrier assigned for inter-carrier information.

30. The method of claim 29, wherein tuning to the predetermined channel of the neighboring wireless carrier further comprises receiving a command from the serving base station to perform the tuning.

31. The method of claim 26, further comprising employing the set of data to acquire a quality or performance information set pertaining to the neighboring wireless carrier at least in part to determine whether to conduct a handover from the serving wireless carrier to the neighboring wireless carrier.

32. The method of claim 31, wherein employing the set of data to acquire the quality or performance information set further comprises calculating a transmit energy metric, a pathloss, an effective geometry, a projected data rate or a control channel reliability metric pertaining to the neighboring wireless carrier.

33. The method of claim 32, further comprising determining whether to conduct a handover to the neighboring wireless carrier at least in part based on results of the calculating.

34. The method of claim 26, further comprising employing a periodicity associated with transmission of the set of data in conjunction with obtaining the set of data.

35. An apparatus configured for wireless communication, comprising:
   a wireless communication interface for receiving wireless signals on multiple wireless carriers;
   memory for storing instructions; and
   a data processor for executing modules to implement the instructions, the modules comprising:
   an acquisition module that tunes the wireless communication interface to an acquisition channel to obtain, from a serving base station, a cell selection data set relevant to mobile handover decisions involving a non-serving carrier; and
   a decision module that employs the cell selection data set at least in part for determining whether to perform a handover from a serving carrier to the non-serving carrier, wherein a periodicity of transmission of cell selection data set is utilized to determine a particular channel on which the cell selection data set is transmitted and the particular channel comprises a low frequency reuse channel.

36. The apparatus of claim 35, wherein the acquisition module tunes to the acquisition channel upon receiving a command from the serving base station operating on the serving carrier.

37. The apparatus of claim 35, wherein the acquisition channel is a serving channel on the serving carrier.

38. The apparatus of claim 35, wherein the cell selection data set at least in part includes a handover command from the serving base station instructing the apparatus to perform the handover to the non-serving carrier if a condition pertaining to a wireless channel of the non-serving carrier is met.

39. The apparatus of claim 38, further comprising a measurement module that analyzes a characteristic of the wireless channel to determine if the condition is met, wherein the decision module determines to perform the handover if the condition is met.

40. The apparatus of claim 39, wherein the condition is met if the characteristic of the wireless channel exceeds a threshold value, the characteristic comprising at least one of:
   transmit energy of a downlink signal of the wireless channel;
   pathloss of the wireless channel;
   effective geometry of the wireless channel;
   projected data rate of the wireless channel;
   control channel reliability of the wireless channel; or
   a combination thereof.

41. The apparatus of claim 39, wherein the characteristic of the wireless channel is specified as part of the cell selection data set.

42. The apparatus of claim 35, further comprising an analysis module that computes a characteristic of the non-serving carrier from the cell selection data set, wherein the cell selection data set pertains to the non-serving carrier and comprises at least one of:
   cell or carrier loading information;
   power class information;
   closed subscriber group information;
   anchor carrier information;
   full or partial cell identity;
   number of, or identifier for, the non-serving carrier, or a subband, a channel or a hybrid automatic repeat request interlace thereof, on an uplink or downlink;
   a fraction of resources allocated to a typical mobile terminal on the non-serving carrier;
   interference level for the non-serving carrier, or the subband, the channel or the hybrid automatic repeat request interlace thereof;
   a data rate on the downlink or the uplink;
   a quality of service guarantee;
   backhaul bandwidth;
   effective isotropic radiated power;
   maximum power amplifier output power;
   receiver noise figure; or
   base station battery power level.

43. The apparatus of claim 35, wherein the acquisition channel comprises a pilot channel, a control channel, a broadcast channel, a preamble channel, a data channel, or a combination thereof 44. The apparatus of claim 43, wherein at least one of:
   the pilot channel comprises a synchronization channel or a beacon channel;
   the control channel comprises a physical downlink channel;
   the broadcast channel or the preamble channel comprises a physical broadcast channel; or
   the data channel comprises a physical downlink shared channel.

45. The apparatus of claim 35, further comprising a timing module that instructs the acquisition module to tune to the acquisition channel at a specific period associated with the non-serving carrier.

46. A mobile device for wireless communication, comprising:
- means for obtaining a set of data related to a neighboring wireless carrier from a serving base station;
- means for obtaining quality or performance information pertaining to a serving wireless carrier utilized by the mobile device served by the serving base station; and
- means for determining whether to handover from the serving wireless carrier to the neighboring wireless carrier based on the set of data and the quality or performance information, wherein a periodicity of transmission of the set of the data is utilized by the mobile device to determine a particular channel on which the set of the data is transmitted by the serving base station and the particular channel comprises a low frequency reuse channel.

47. At least one processor within a mobile device configured for wireless communication, comprising:
- a module that obtains a set of data related to a neighboring wireless carrier from a serving base station;
- a module that generates quality or performance information pertaining to a serving wireless carrier utilized by the mobile device served by the serving base station; and
- a module that determines whether to hand over from the serving wireless carrier to the neighboring wireless carrier based on the set of data and the quality or performance information, wherein a periodicity of transmission of the set of data is utilized by the mobile device to determine a particular channel on which the set of data is transmitted by the serving base station and the particular channel comprises a low frequency reuse channel.

48. A computer program product, comprising:
a non-transitory computer-readable medium, comprising:
- code for causing a computer, within a mobile device, to obtain a set of data related to a neighboring wireless carrier from a serving base station;
- code for causing the computer to generate quality or performance information pertaining to a serving wireless carrier utilized by the mobile device served by the serving base station; and
- code for causing the computer to determine whether to handover from the serving wireless carrier to the neighboring wireless carrier based on the set of data and the quality or performance information, wherein a periodicity of transmission of the set of data is utilized by the mobile device to determine a particular channel on which the set data is transmitted by the serving base station and the particular channel comprises a low frequency reuse channel.

49. The apparatus of claim 23, further comprising means for computing a metric for a downlink signal on the first carrier frequency based on at least a second subset of the set of cell selection data.

50. The apparatus of claim 49, wherein the metric of the downlink signal comprises at least one of:
- a transmit energy metric indicative of transmit energy of the downlink signal;
- a pathloss indicative of channel gain between the user equipment and an entity that transmits the downlink signal;
- an effective geometry metric indicative of received quality of the downlink signal at the user equipment;
- a projected data rate indicative of an achievable or supported data rate for the user equipment; or
- a control channel reliability metric indicative of reliability of control channels on the non-serving carrier.

51. The apparatus of claim 49, wherein the subset of the set of cell selection data at least in part comprises the metric of the downlink signal.

52. The mobile device of claim 46, further comprising means for computing a characteristic of the neighboring wireless carrier from the set of data, wherein the set of data pertains to the neighboring wireless carrier and comprises at least one of:
- cell or carrier loading information;
- power class information;
- closed subscriber group information;
- anchor carrier information;
- full or partial cell identity;
- number of, or identifier for, the non-serving carrier, or a subband, a channel or a hybrid automatic repeat request interlace thereof, on an uplink or downlink;
- a fraction of resources allocated to a typical mobile terminal on the neighboring wireless carrier;
- interference level for the non-serving carrier, or the subband, the channel or the hybrid automatic repeat request interlace thereof;
- a data rate on the downlink or the uplink;
- a quality of service guarantee;
- backhaul bandwidth;
- effective isotropic radiated power;
- maximum power amplifier output power;
- receiver noise figure; or
- base station battery power level.

53. The mobile device of claim 46, wherein the set of data is obtained on an acquisition channel, and wherein the acquisition channel comprises a pilot channel, a control channel, a broadcast channel, a preamble channel, a data channel, or a combination thereof.

54. The mobile device of claim 53, wherein at least one of:
- the pilot channel comprises a synchronization channel or a beacon channel;
- the control channel comprises a physical downlink channel;
- the broadcast channel or the preamble channel comprises a physical broadcast channel; or
- the data channel comprises a physical downlink shared channel.

* * * * *